(12) United States Patent
Cox

(10) Patent No.: US 8,255,368 B2
(45) Date of Patent: Aug. 28, 2012

(54) APPARATUS AND METHOD FOR POSITIONING USER-CREATED DATA IN OLAP DATA SOURCES

(75) Inventor: Reuben Michael Arthur Cox, Vancouver (CA)

(73) Assignee: SAP France S.A., Paris (FR)

(*) Notice: Subject to any disclaimer, the term of this patent is extended or adjusted under 35 U.S.C. 154(b) by 355 days.

(21) Appl. No.: 12/032,602

(22) Filed: Feb. 15, 2008

(65) Prior Publication Data

US 2009/0210438 A1 Aug. 20, 2009

(51) Int. Cl.
*G06F 7/00* (2006.01)
(52) U.S. Cl. ............................................ 707/651
(58) Field of Classification Search .................... 707/651
See application file for complete search history.

(56) References Cited

U.S. PATENT DOCUMENTS

| 6,651,055 B1 | 11/2003 | Kilmer et al. |
| 2005/0165733 A1* | 7/2005 | Strovink ............................ 707/2 |
| 2007/0130116 A1* | 6/2007 | Cras et al. ......................... 707/2 |

FOREIGN PATENT DOCUMENTS

WO WO 03012698 2/2003

* cited by examiner

*Primary Examiner* — Truong Vo
(74) *Attorney, Agent, or Firm* — Mintz, Levin, Cohn, Ferris, Glovsky and Popeo, P.C.

(57) ABSTRACT

A computer readable storage medium comprises executable instructions to receive user-created data for user-specified positions in an OLAP hierarchy. The OLAP hierarchy is reorganized according to the user-created data. Data manipulation statements are generated to evaluate a set of members of the OLAP hierarchy according to the user-specified positions.

18 Claims, 24 Drawing Sheets

APPARATUS AND METHOD FOR POSITIONING USER-CREATED DATA IN OLAP DATA SOURCES

FIELD OF THE INVENTION

This invention relates generally to the creation and positioning of data members of OLAP data sources. More particularly, this invention relates to techniques for enabling users to create and evaluate data sets for an OLAP hierarchy according to user-specified positions.

BACKGROUND OF THE INVENTION

Business Intelligence generally refers to a category of software systems and applications used to improve business enterprise decision-making and governance. These software tools provide techniques for analyzing and leveraging enterprise applications and data. They are commonly applied to financial, human resource, marketing, sales, service provision, customer, and supplier analyses. More specifically, Business Intelligence tools can include reporting and analysis tools to analyze, forecast and present information, content delivery infrastructure systems to deliver, store and manage reports and analytics, data warehousing systems to cleanse and consolidate information from disparate sources, integration tools to analyze and generate workflows based on enterprise systems, database management systems to organize, store, retrieve and manage data in databases, such as relational, Online Transaction Processing ("OLTP") and Online Analytic Processing ("OLAP") databases, and performance management applications to provide business metrics, dashboards, and scorecards, as well as best-practice analysis techniques for gaining business insights.

In many organizations, data is stored in multiple formats and data sources that are not readily compatible. Data sources include sources of data that enable data storage and retrieval. Data sources may include databases, such as, relational, transactional, hierarchical, multidimensional (e.g., OLAP), object oriented databases, and the like. Further data sources may include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity ("ODBC") and the like. Data sources may also include a data source where the data is not stored like data streams, broadcast data, and the like. Data sources are comprised of values and objects, such as dimensions, columns, rows, attributes, measures and the like, otherwise referred to as data model objects.

OLAP data sources and tools are a subset of BI tools. There are a number of commercially available OLAP tools, such as, for example, Business Objects Voyager™, available from Business Objects™ of San Jose, Calif. OLAP tools are report generation tools and are otherwise suited to ad hoc analyses. OLAP generally refers to a technique of providing fast analysis of shared multidimensional information stored in a database. OLAP systems provide a multidimensional conceptual view of data, including full support for hierarchies and multiple hierarchies. This framework is used because it is a logical way to analyze businesses and organizations. In some OLAP tools, the data is arranged in a schema which simulates a multidimensional schema. The multidimensional schema means redundant information is stored, but it allows for users to initiate queries without the need to know how the data is organized.

OLAP is typically implemented in a multi-user client/server mode to offer consistently rapid responses to queries, regardless of database size and complexity. OLAP helps the user synthesize information through use of an OLAP server that is specifically designed to support and operate on multidimensional data sources. The design of the OLAP server and the structure of the data are optimized for rapid ad hoc information retrieval in any orientation, as well as for fast, flexible calculation and transformation of raw data members on formulaic relationships.

The querying process for OLAP can involve, depending on the specific implementation, writing and executing a query. Multidimensional Expressions ("MDX") is a query language for OLAP databases, like SQL is a query language for relational databases. Thus, an MDX statement can be used to query for a result from an OLAP data source, i.e., an OLAP data cube. The MDX statements may resemble SQL statements that are used to query for data arranged on rows and columns of a data cube. As with an SQL entry, each MDX query requires a data request (the "SELECT" clause), a starting point (the "FROM" clause), and a filter (the "WHERE" clause). These and other keywords provide the tools used to extract specific portions of data from a cube for analysis, e.g., to extract a slice of the cube.

In one application, MDX queries can be used to specify the addition of a calculation to a hierarchy of multidimensional data. There are two ways to achieve this. The first uses the MDX "CREATE MEMBER" clause:
CREATE MEMBER
   [CubeName].[hierarchyName].[ParentName].[MemberName] AS MDX_Expression . . . .
The second way uses an MDX "WITH" clause:
WITH MEMBER
   [CubeName].[hierarchyName].[ParentName].[MemberName] AS MDX_Expression . . . .
THE MDX_Expression determines the value of the calculation. The calculation need not be a dynamic value and a can be a static value.

The location of the added calculations in the given hierarchy can only, however, be specified with limited precision. With both the "CREATE MEMBER" and "WITH" clauses above, a calculation may be added to a hierarchy by specifying its parent. The location of a calculation within a sibling group cannot be specified in a native MDX statement.

For example, consider the process flow illustrated in FIG. 1A for adding calculations to an OLAP hierarchy. OLAP hierarchy 100 includes a root member "A" and two children, "B" and "C". Now consider a user implementing an MDX statement to add a calculation "X" to OLAP hierarchy 100. The user may add the calculation "X" by using either one of the MDX statements above, for example, by using:
CREATE MEMBER [MyCube].[MyHierarchy].[A].[X] as '<<expression>>'
This MDX statement specifies that the new calculation "X" is to be added to OLAP hierarchy 100 as a child of "A". As illustrated in FIG. 1A, OLAP hierarchy 100 already has two children, "B" and "C". When adding another child to root node "A", the OLAP server does not know the relative position of "X" relative to its siblings, "B" and "C". Accordingly, the OLAP server can only position a new calculation as the last child of the specified parent. In this case, the new calculation "X" can only be added after "C" as the last child of "A", as shown in the updated OLAP hierarchy 105

The user may add another calculation, e.g., "Y", to OLAP hierarchy 105, using the following MDX statement:
CREATE MEMBER [MyCube].[MyHierarchy].[A].[Y] as '<<expression>>'
Similarly, this new calculation "Y" can only be added after "X" as the last child of "A", as shown in the updated OLAP hierarchy 110. The user cannot, for example, specify that "Y" is to be the first or one of the middle children of "A" in the OLAP hierarchy.

Some types of calculations have natural or intuitive positions relative to siblings. For example, when determining the difference between two members in a list of members it is useful to place the calculation between the two members of interest and not at the end of the list. Also, when creating a calculation for each existing member, pairing the calculation besides the member is helpful to the user.

In the OLAP hierarchy 100 illustrated in FIG. 1A, for example, if "X" were a calculation to add the values of "B" and "C", it would be useful to place it in between "B" and "C" instead of after "C" as the last child of "A" as shown in OLAP hierarchy 105.

Accordingly, it would be desirable to provide techniques to enable users to create data members in arbitrary positions of an OLAP hierarchy. In particular, it would be desirable to provide techniques to create and evaluate data sets of an OLAP hierarchy according to user-specified positions.

SUMMARY OF THE INVENTION

The invention includes a computer readable storage medium with executable instructions to receive user-created data for user-specified positions in an OLAP hierarchy. The OLAP hierarchy is reorganized according to the user-created data. Data manipulation statements are generated to evaluate a user-created data set from the OLAP hierarchy according to the user-specified positions.

The invention also includes a method for positioning user-created data in an OLAP hierarchy. User-created data is received in user-specified positions in an OLAP hierarchy. The OLAP hierarchy is reorganized according to the user-created data. Data manipulation statements are generated to insert the user-created data at the user-specified positions in the reorganized OLAP hierarchy. Members of the OLAP hierarchy are evaluated according to the user-specified positions.

The invention further includes a method for evaluating a set of members of an OLAP hierarchy. Members of the set are created at user-specified positions. The OLAP hierarchy is reorganized according to the created members. Data manipulation statements are generated to return results for the evaluation according to the user-specified positions.

BRIEF DESCRIPTION OF THE DRAWINGS

The invention is more fully appreciated in connection with the following detailed description taken in conjunction with the accompanying drawings, in which like reference characters refer to like parts throughout, and in which.

DETAILED DESCRIPTION OF THE INVENTION

The present invention provides a system, method, software arrangement, and computer readable storage medium for positioning user-created data in OLAP data sources. An OLAP data source, as generally used herein, refers to any multidimensional data source providing a multidimensional conceptual view of data, including full support for hierarchies and multiple hierarchies. An OLAP hierarchy may contain a plurality of members, including non-calculated members and calculations, organized in hierarchical order.

The members of an OLAP hierarchy may be organized into one or more sets, where a set generally refers to a set of members as specified by a user in an MDX "CREATE SET" statement. The hierarchical order, as generally used herein, specifies the order in which members are visited in a depth first traversal of the hierarchy where parents are ordered before their children. Only the non-calculated members of the hierarchy may have children.

According to an embodiment of the invention, a user may create data sets of an OLAP hierarchy where the set members are in user-specified positions. The user may, for example, create new calculations for an OLAP hierarchy and specify the positions of the new calculations relative to other members of the hierarchy. A graphical user interface ("GUI") may be provided to the user for creating a set of an OLAP hierarchy and adding calculations to the set in user-specified positions. The user-specified positions may include positions to the left or to the right of another member in the set. That is, in addition to specifying the lineage of a new calculation to be added to the OLAP hierarchy, the user may also specify its order relative to its siblings.

Figures 1A, 1B:
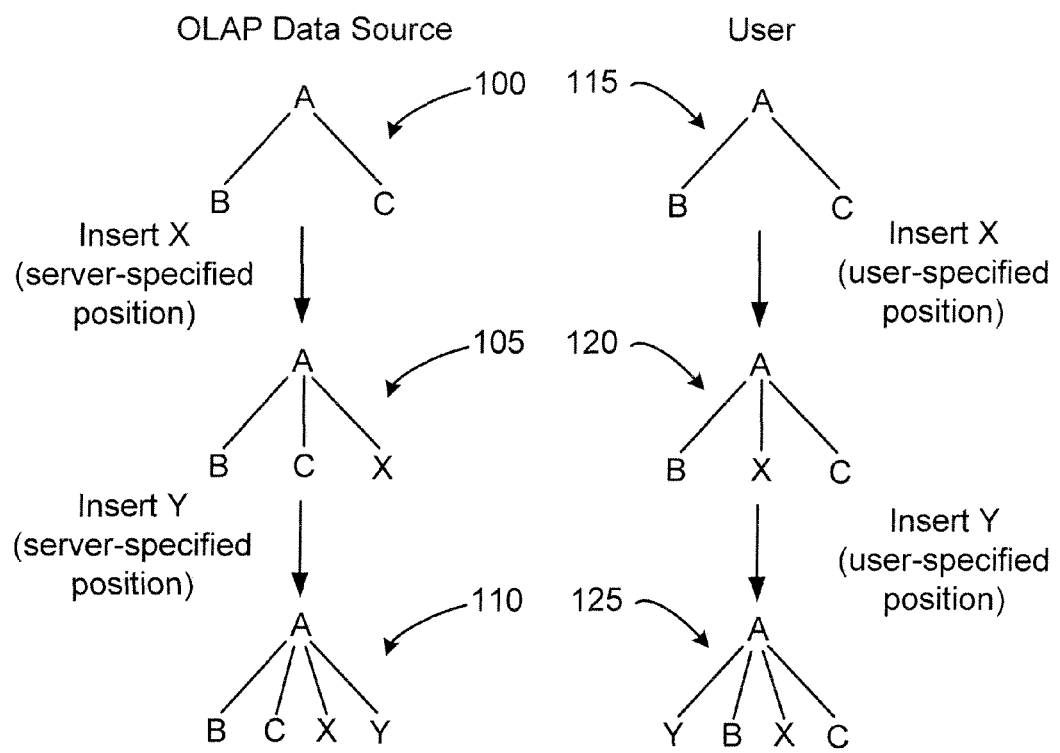
FIG. 1A illustrates a prior art process flow for adding a calculation to an OLAP hierarchy.
FIG. 1B illustrates a process flow for adding a calculation to an OLAP hierarchy in accordance with an embodiment of the invention.

For example, consider the process flow illustrated in FIG. 1B for adding calculations to an OLAP hierarchy in accordance with an embodiment of the invention. OLAP hierarchy 115 includes a root member "A" and two children, "B" and "C". In one embodiment, a user may add a calculation to the left or to the right of an existing member. For example, the user may add calculation "X" as a child of "A" and to the left of "C" and to the right of "B", as in OLAP hierarchy 120. The user may also add calculation "Y" as a child of "A" and to the left of "B", as in OLAP hierarchy 125.

According to an embodiment of the invention, when a user creates a calculation to be added to an OLAP hierarchy in user-specified positions, the calculation is inserted into the OLAP hierarchy using native MDX "CREATE MEMBER" or "WITH" statements (as described above). The calculations are inserted in server-specified positions in the OLAP hierarchy and the OLAP hierarchy is stored in the OLAP server according to those positions, that is, the calculations are inserted in the hierarchy according to their lineage as described above.

The OLAP hierarchy is then reorganized to reposition the user-created data from the server-specified positions into the user-specified positions when evaluating data sets from the OLAP hierarchy created by the user. That is, in one embodiment, when a user creates or selects a data set from the OLAP hierarchy to be evaluated, the data set is evaluated according to the user-specified positions of the reorganized OLAP hierarchy.

Figure 2:
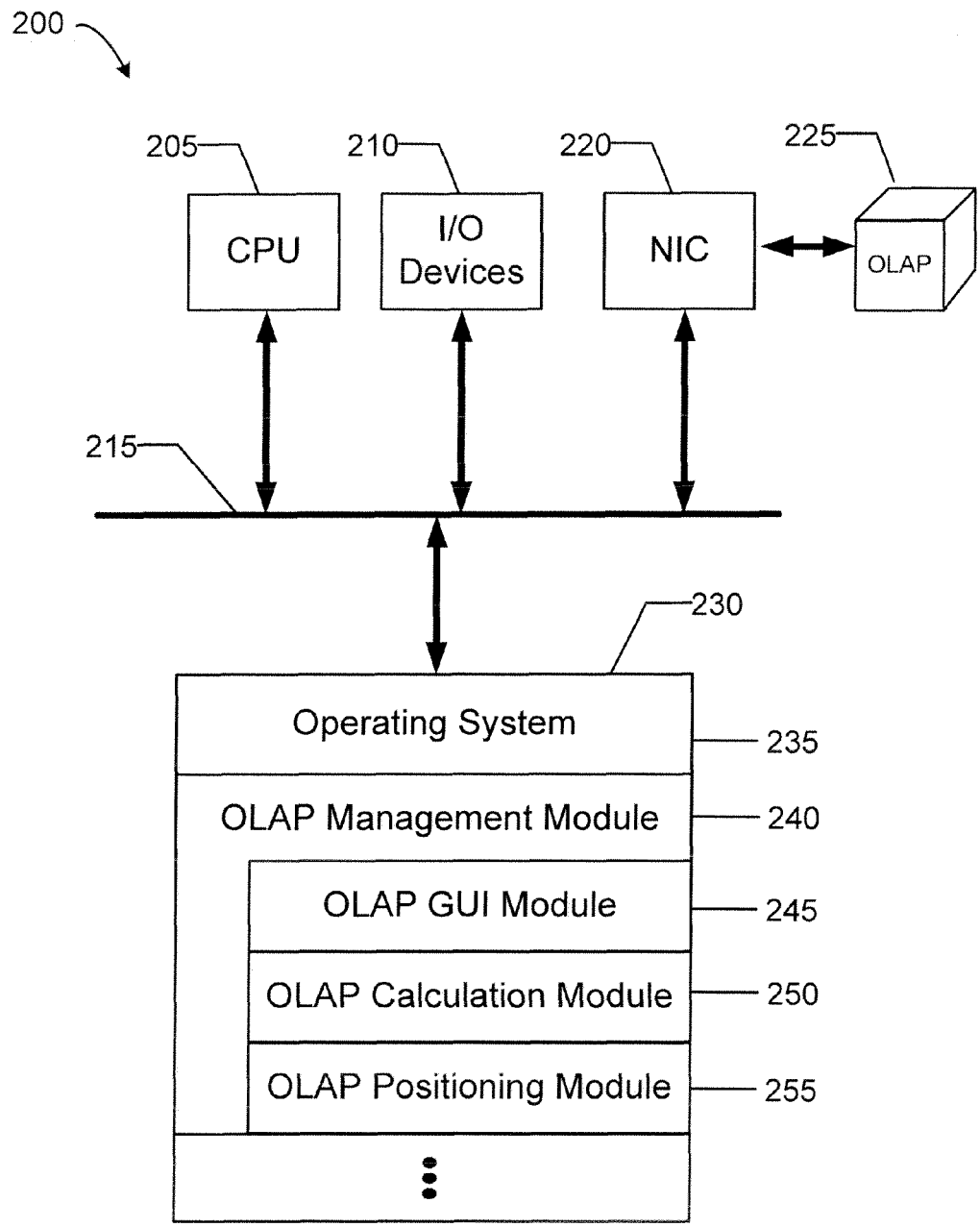
FIG. 2 illustrates a computer constructed in accordance with an embodiment of the invention.

FIG. 2 illustrates a network appliance configured in accordance with an embodiment of the invention. Computer 200 includes standard components, including a Central Processing Unit ("CPU") 205 and input/output devices 210, which are linked by a bus 215. Input/output devices 210 may include a keyboard, mouse, display screen, monitor, printer, and the like.

Network Interface Circuit ("NIC") 220 may also be connected to the bus 215. NIC 220 provides connectivity to a wired or a wireless network (not shown), thereby allowing computer 200 to operate in a networked environment. For example, networked data sources 225 are connected to computer 200 through NIC 220. In accordance with an embodiment of the invention, networked data sources 225 may include an OLAP data source in an OLAP server.

Memory 230 is also connected to the bus 215. In one exemplary embodiment, memory 230 stores one or more of the following modules: an Operating System module 135 and an OLAP Management module 240. Operating system module 235 may include instructions for handling various system services, such as file services or for performing hardware dependant tasks. The OLAP Management module 240 may include executable instructions for performing OLAP related tasks, including supporting a graphical user interface ("GUI") and interfacing with an OLAP data source.

According to an embodiment of the invention, OLAP Management module 240 includes an OLAP GUI module 245, an OLAP Calculation module 250, and an OLAP Positioning module 255. The OLAP GUI module 245 may rely upon standard techniques to produce graphical components of a user interface, e.g., windows, icons, buttons, menu and the like, for accessing and managing OLAP data source 225. For example, a user may employ the GUI to define and review the results of a query. In one embodiment, the user may also employ the GUI to create and evaluate data sets for OLAP hierarchies in OLAP data source 225, where the set members include user-created calculations in user-specified positions.

OLAP Calculation module 250 may include executable instructions to evaluate calculations involving members of an OLAP hierarchy, such as, for example, calculations as part of a set created by the user using OLAP GUI module 245. OLAP Positioning module 255 may include executable instructions to, in accordance with an embodiment of the invention, reorganize OLAP hierarchies in OLAP data source 225 to position the user-created calculations in the OLAP hierarchies according to the user-specified positions.

OLAP Positioning module 255 may work in conjunction with OLAP Calculation module 250 to evaluate data sets created by the user according to the user-specified positions. As described in more detail herein below, this involves the generation of data manipulation statements by OLAP Positioning module 255 to insert the user-created calculations in the user-specified positions in the data sets and return the evaluated set members according to the user-specified positions.

It is appreciated that the executable modules stored in memory 230 are exemplary. It is also appreciated that the functions of the modules may be combined. In addition, the functions of the modules need not be performed on a single computer. Instead, the functions may be distributed across a network, if desired.

Indeed, the invention may be commonly implemented in a client-server environment with various components being implemented at the client-side and/or the server-side. For example, one of ordinary skill in the art appreciates that the functions of modules 240-255 may be performed at computer 200 or at a server connected to computer 100. In one exemplary embodiment, some or all of the functions of modules 240-255 may be performed at computer 200. In another exemplary embodiment, some or all of the functions of modules 240-255 may be performed at a server connected to computer 200. As understood by those of ordinary skill in the art, it is the functions of the invention that are significant, not where they are performed or the specific manner in which they are performed.

Figure 3:
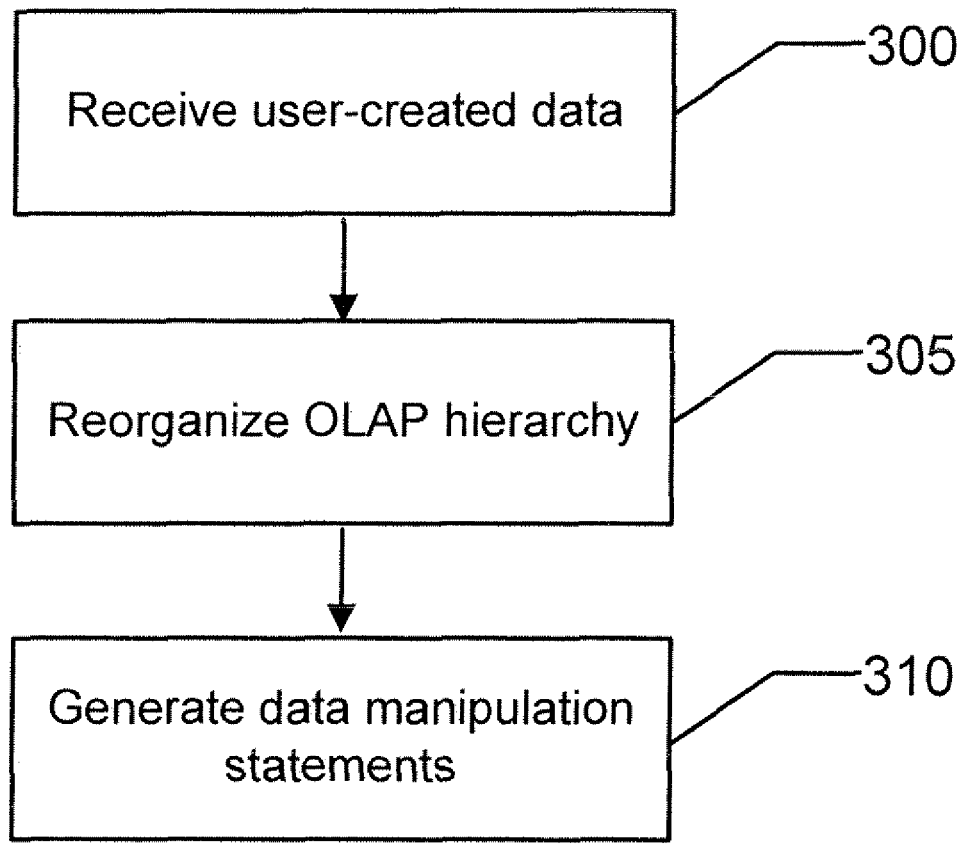
FIG. 3 illustrates a flow chart for positioning user-created data in an OLAP data source in accordance with an embodiment of the invention.

Referring now to FIG. 3, a flow chart for positioning user-created data in an OLAP data source in accordance with an embodiment of the invention is described. First, user-created data is received at user-specified positions (300). In one embodiment, the user-created data may include user-created calculations defined with the use of OLAP GUI module 245. The user may interact with OLAP GUI module 245 to specify a user-created data set containing user-created calculations and other members from a given OLAP hierarchy, such as other calculations (e.g., server-created or user-created) and non-calculated members. The user-created calculations may be defined in OLAP GUI module 245 in user-specified positions, which may be to the left or to the right of another member in the set. That is, in addition to specifying the lineage of a new calculation to be added to a set in the OLAP hierarchy, the user may also specify its order relative to its siblings.

For example, referring back to FIG. 1B described above, the user may interact with OLAP GUI module 245 to specify a new data set containing the user-created calculations "X" and "Y" positioned to the left of non-calculated member "B" and to the right of non-calculated member "C", respectively.

As appreciated by one of ordinary skill in the art, sets created by the user with OLAP GUI module 245 are created with the MDX "CREATE SET" statement. It is also appreciated that sets created with this statement are positioned in the OLAP hierarchy and stored in OLAP data source 225 according to server-specified positions. That is, the user may specify desired positions for the set members using OLAP GUI module 245, but when the sets are added to the OLAP hierarchy with the MDX "CREATE SET" statement, MDX can only create the sets according to the lineage of its set members (as described with reference to FIG. 1A above).

Therefore, in accordance with an embodiment of the invention, after the user creates a new data set with OLAP GUI module 245, OLAP Positioning module 255 reorganizes the OLAP hierarchy based on the user-created data (305). As described in more detail herein below, this involves the generation of data manipulation statements (i.e., MDX statements) to reposition the user-created data from the server-specified positions into the user-specified positions so that the data set is evaluated in the desired (i.e., the user-specified) order (310).

Figure 4A:
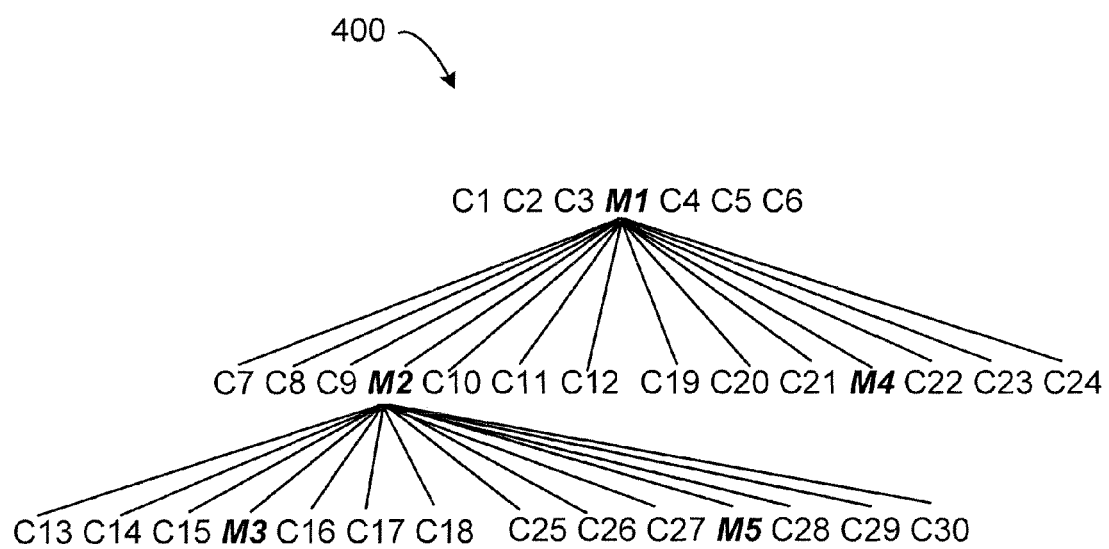
FIG. 4A illustrates an exemplary OLAP hierarchy as specified by a user in accordance with an embodiment of the invention.

An exemplary OLAP hierarchy as specified by a user with OLAP GUI module 245 is illustrated in FIG. 4A. OLAP hierarchy 400 includes calculations C1-C30 created by the user in user-specified positions relative to non-calculated members M1-M5. Non-calculated members M1-M5 are existing members of OLAP hierarchy 400. It is appreciated that OLAP hierarchy 400 can be organized in hierarchical order, with parents coming before children and with calculated members within a sibling group organized as specified by the user. A simple list of the members of hierarchy 400 listed in hierarchical order is: C1 C2 C3 M1 C7 C8 C9 M2 C13 C14 C15 M3 C16 C17 C18 C25 C26 C27 M5 C28 C29 C30 C10 C11 C12 C19 C20 C21 M4 C22 C23 C24 C4 C5 C6.

For example, non-calculated member M1 is the parent of non-calculated members M2 and M4, and M2, in turn, is the parent of non-calculated members M3 and M5. A parent's children form a sibling group. All the members on the top (i.e., root) level, even though they have no parent, also form a sibling group. For example, M1's sibling group includes calculations C1-C6.

Hierarchy 400 therefore shows three sibling groups: M1's sibling group including calculations C1-C6; a sibling group that contains M2 and M4 and includes calculations C7-C12 and C19-C24; and a sibling group containing M3 and M5 and calculations C13-C18 and C25-C30. The calculation's position within a sibling group is illustrated as specified by the user. As described above, the user may create calculations either to the left or to the right of other members in the OLAP hierarchy.

It is appreciated that OLAP hierarchy 400 may represent multiple sets of data created by the user. Each set may contain zero, one or more calculations and, or non-calculated members of OLAP hierarchy 400. A set may contain set members from any sibling group shown in OLAP hierarchy 400. It is also appreciated that the user may name the sets with OLAP GUI module 245 for later use and evaluation. The user may also specify a set to correspond to the entire OLAP hierarchy 400.

Figure 4B:
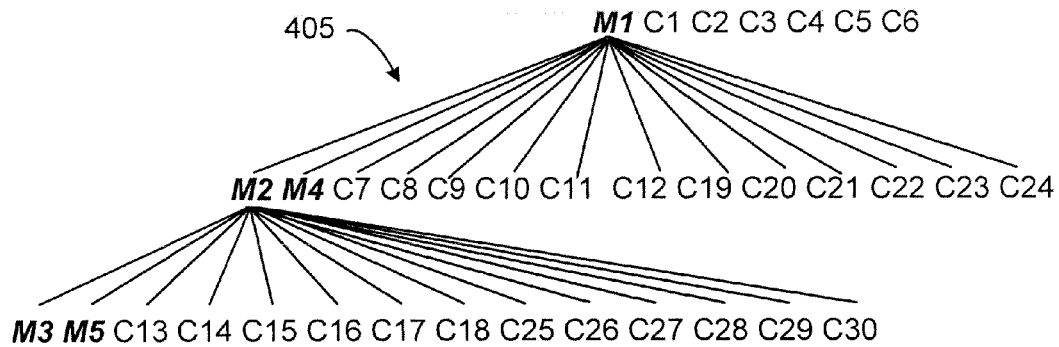
FIG. 4B illustrates the exemplary OLAP hierarchy of FIG. 4A as stored by the OLAP server in accordance with an embodiment of the invention.

The exemplary OLAP hierarchy 400 of FIG. 4A as stored by the OLAP server in accordance with an embodiment of the invention is illustrated in FIG. 4B. As described above, sets created by the user are stored in the OLAP server using MDX "CREATE SET" statements, which are usually sorted using the MDX statement "HIERARCHIZE." The MDX statement "HIERARCHIZE" can only position set members according to their lineage. Accordingly, OLAP hierarchy 405 shows the calculations created by the user by lineage and order of creation within a sibling group.

It is appreciated that OLAP hierarchy 405 is organized in hierarchical order as allowed by the expressivity of MDX and therefore allowed by the OLAP server, with parents coming before their children and calculated members within a sibling group appearing at the end of the sibling group organized therein by order of creation. For example, calculations C1-C6 are shown to be within M1's sibling group listed in the order they were created by the user rather than in the order specified by the user as shown in FIG. 4A, i.e., with C1-C3 to the left of M1 and C4-C6 to the right of M1. A simple list of members in hierarchy 405 in the hierarchical order that MDX and thus the OLAP server allows is: M1 M2 M3 M5 C13 C14 C15 C16 C17 C18 C25 C26 C27 C28 C29 C30 M4 C7 C8 C9 C10 C11 C12 C19 C20 C21 C22 C23 C24 C1 C2 C3 C4 C5 C6.

With the OLAP hierarchy 405 stored in the OLAP server and the OLAP hierarchy 400 illustrating the desired, user-specified positions of its members, any set created by the user, in accordance with an embodiment of the invention, is evaluated to return its members in their desired, user-specified, positions. To do so, OLAP Positioning module 255 generates data manipulation statements to evaluate the user-created set according to the desired, i.e., user-specified order.

Figure 4C:
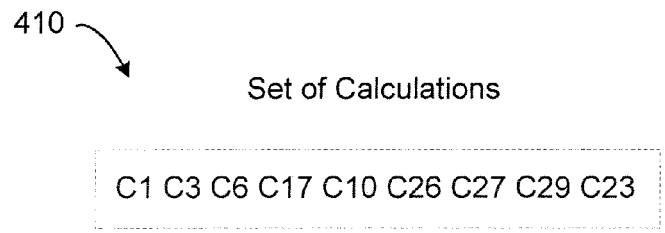
FIG. 4C illustrates an exemplary data set created by the user in accordance with an embodiment of the invention.

For example, FIG. 4C illustrates an exemplary data set created by the user in accordance with an embodiment of the invention. Set 410 lists calculations C1, C3, C6, C17, C10, C26, C27, C29, and C23, which, as illustrated in FIG. 4A, are positioned in different levels and sibling groups of the desired OLAP hierarchy 400. As described in more detail herein below, generating data manipulation statements to evaluate a set such as set 410 according to the desired order involves recursively splitting set into two parts: a first part including members that should appear before a corresponding non-calculated member, and a second part including the members that should appear after a corresponding non-calculated member. Any calculated members that are situated at the position in the hierarchy indicated by the split are then inserted into the split.

In one embodiment, and as described in more detail herein below, ordering the members involves recording the user-created calculations in data structures referred herein as "calculation chains," recursively splitting the set and inserting each one of these chains in the split. A calculation chain may be an ordered list of calculations and one non-calculated member from the OLAP hierarchy. The order may be a hierarchical or a reverse hierarchical order. A calculation chain may either begin or end with a non-calculated member. Two calculations next to each other in a chain cannot have any non-calculated members existing between them in the OLAP hierarchy.

Figure 4D:
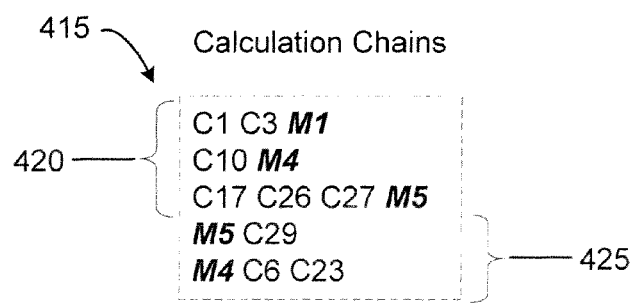
FIG. 4D illustrates a set of calculation chains corresponding to the OLAP hierarchy of FIG. 4A and the data set of FIG. 4C in accordance with an embodiment of the invention.

For example, FIG. 4D illustrates a set of calculation chains corresponding to the OLAP hierarchy of FIG. 4A and the data set of FIG. 4C in accordance with an embodiment of the invention. Calculation chains 415 show the calculations in set 410 organized in chains that are anchored by a non-calculated member. Calculation chain 420 shows the calculations that should appear before their corresponding non-calculated member. For example, calculations C1 and C3 in set 410 are included in a chain anchored by M1, which is the non-calculated member in C1's and C3's sibling group in the desired OLAP hierarchy 400 as specified by the user. C1 and C3 both appear to the left of M1, as specified by the user.

Similarly, calculations C17, C26 and C27 in set 410 are included in a chain anchored by M5, which is the closest non-calculated member following C27 in the hierarchy. It is appreciated that this chain could be alternatively expressed as "M3 C17 C26 C27", with M3 anchoring the chain instead of M5. This is so because M3 is the non-calculated member that appears before C 17 in the desired OLAP hierarchy 400.

The other calculations C6, C10, C29, and C23 that appear in set 410 are similarly included in chains "C10 M4" (with C10 anchored by the next non-calculated member in the desired hierarchical order). Calculation chains 425 show the calculations that should appear before their corresponding non-calculated member. For example, "M5 C29" (with C29 anchored by the next non-calculated member in the desired hierarchical order) and "M4 C6 C23". This latter chain takes into account last sibling calculations that are among the rightmost calculations within a sibling group, as described in more detail herein below.

Figure 5:
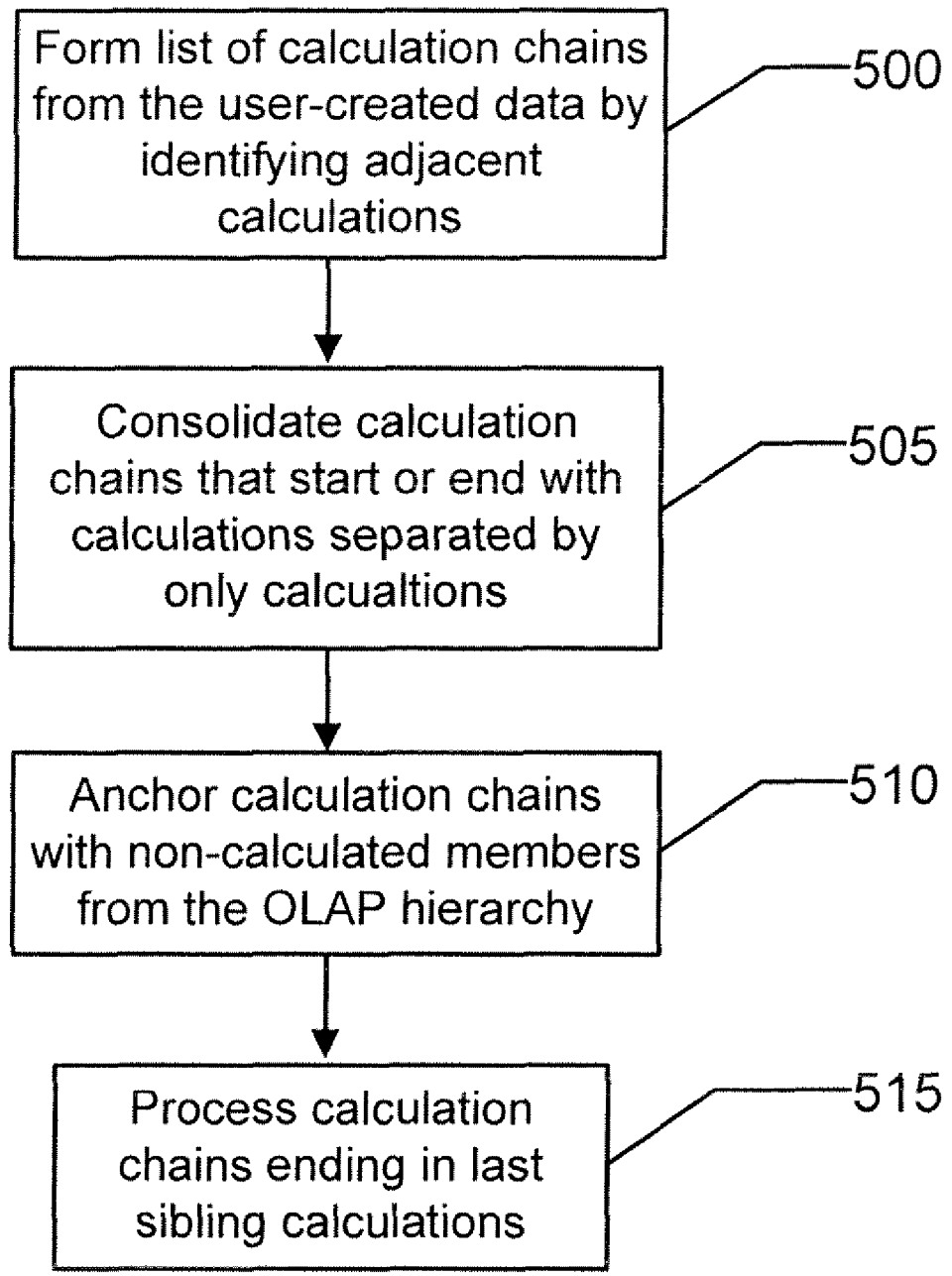
FIG. 5 illustrates a flow chart for creating calculation chains in accordance with an embodiment of the invention.

Referring now to FIG. 5, a flow chart for creating calculation chains in accordance with an embodiment of the invention is described. Calculation chains are created by OLAP Positioning module 255 for a given user-created set. First, an initial list of calculation chains is formed from the user-created data by seeing if any calculations are the next siblings of each other (500). Next, any calculation chains in the list where the beginning and end points of the chains are siblings only separated by calculated members are consolidated, i.e., the chains are joined together (505). The consolidated calculation chains are then anchored by non-calculated members from the OLAP hierarchy (510). Lastly, calculation chains having last sibling calculations are processed (515).

Each one of these operations is described in more detail herein below, with reference to the exemplary OLAP hierarchy 400 shown in FIG. 4A and the exemplary user-created set shown in FIG. 4C.

Figure 6:
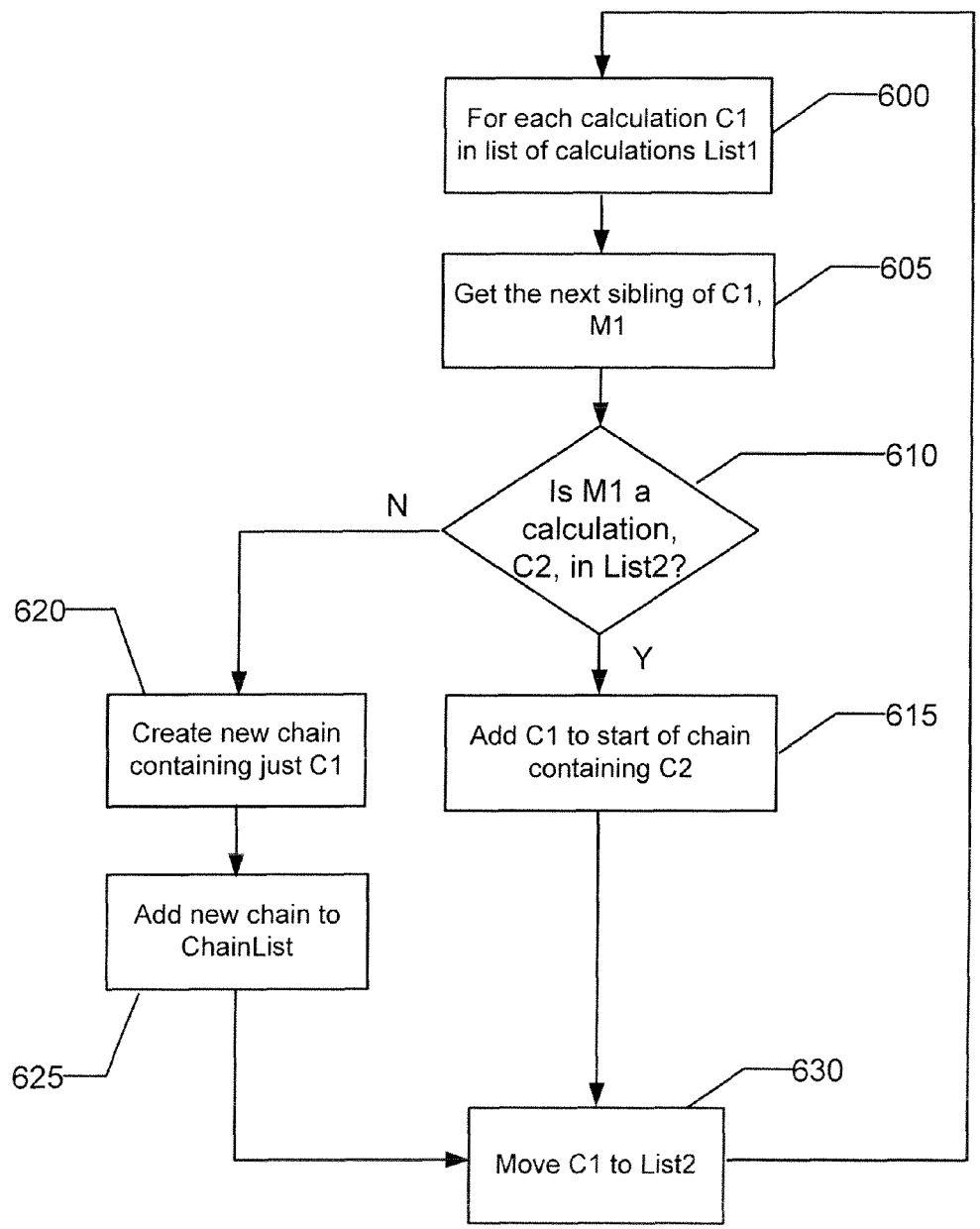
FIG. 6 illustrates a flow chart for forming an initial list of calculation chains from a user-created data set in accordance with an embodiment of the invention.

Referring now to FIG. 6, a flow chart for forming an initial list of calculation chains from a user-created data set in accordance with an embodiment of the invention is described. Two lists of calculations are initially created, namely: "List1", which contains all the calculations in the user-created set, and "List2", which is initially empty. The list of calculation chains is stored in a list referred to as "ChainList".

The OLAP Positioning module 255 proceeds as follows. For each calculation, C1, in the list of calculations List1 (600), the next sibling of C1 in the desired OLAP hierarchy, M1, is obtained (605). M1 is then checked to determine whether it is a calculation, C2, in List2 (610). If it is not, then a new chain containing just C1 is created (620) and the chain is added to ChainList (625). If it is, C1 is added to the start of the chain in ChainList containing C2 (630). C1 is then moved to List2 (630).

Figure 7:
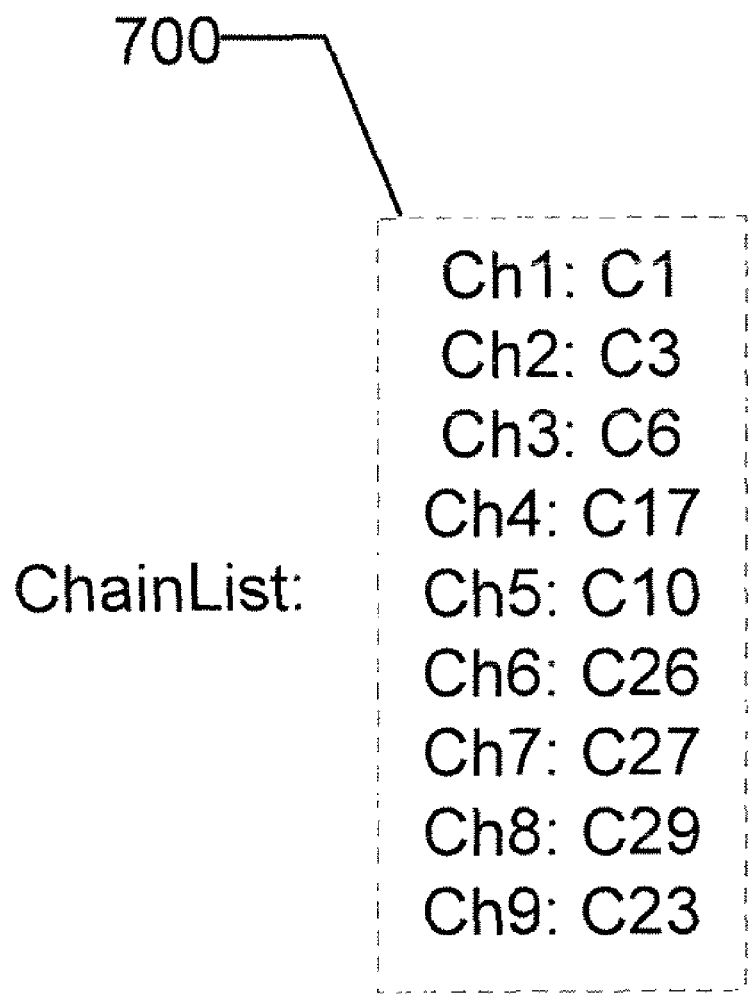
FIG. 7 illustrates the resulting calculation chains after executing the operations of FIG. 6 for the exemplary set of FIG. 4C in accordance with an embodiment of the invention.

FIG. 7 illustrates the resulting calculation chains after executing the operations of FIG. 6 for the exemplary set of FIG. 4C in accordance with an embodiment of the invention. The list of calculation chains, ChainList 700, is shown to contain nine chains, with each chain including a single calculation from the user-created set 410 illustrated in FIG. 4C.

Figure 8:
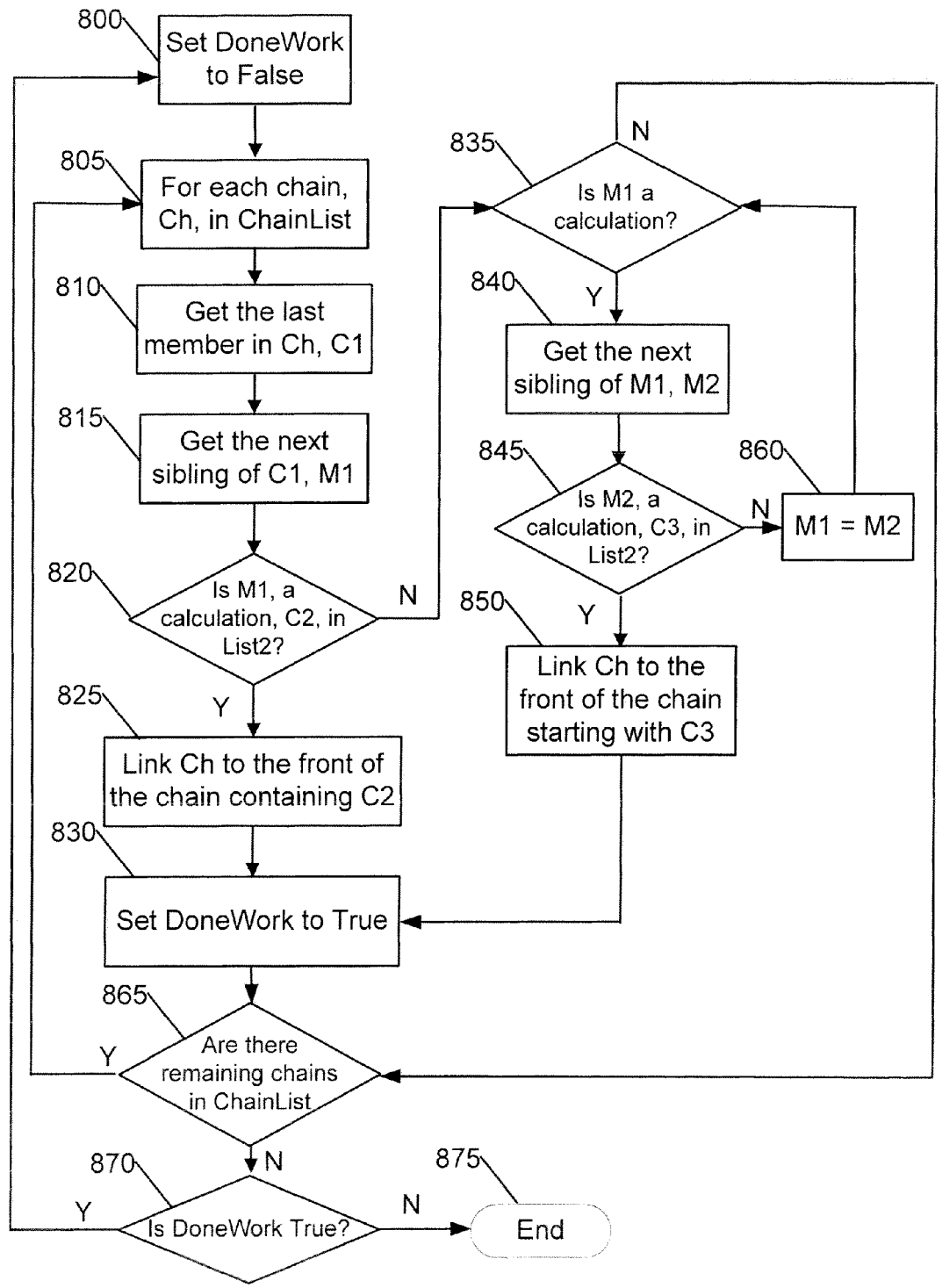
FIG. 8 illustrates a flow chart for consolidating calculation chains having common siblings in accordance with an embodiment of the invention.

The next step in creating the calculation chains consolidates the chains whose beginning or end points are siblings only separated by calculated members (505). Referring now to FIG. 8, a flow chart for consolidating calculation chains having common siblings in accordance with an embodiment of the invention is described. First, a checking status variable, DoneWork, is set to False (800). Then, for each chain, Ch, in ChainList (805), the last member in the chain, C1, is obtained (810). The next sibling of C1, M1, is then determined (815). M1 is then checked to determine whether it is a calculation, C2, in List2 (820).

If it is, the chain Ch is linked to the front of the chain containing C2 (825), thereby consolidating the two chains. DoneWork is set to true (830). If there are any further chains in ChainList (865), then OLAP Positioning module 255 proceeds to evaluating the next chain in ChainList (805). If there are no more chains in ChainList to examine then the DoneWork status variable is checked (870). If DoneWork is true then the OLAP Positioning module 255 proceeds to examining the chains in ChainList from the beginning again looking for more consolidations. If DoneWork is false, then this consolidation operation is complete.

If M1 is not a calculation in List2, then M1 is checked to determine whether it is a calculation or a non-calculated member (835). If M1 is not a calculation, OLAP Positioning module 255 proceeds as illustrated to check the next chain, Ch, in ChainList (805).

If M1 is a calculation, the next sibling of M1, M2, is determined (840). M2 is then checked to determine whether it's a calculation, C3, in List2 (845). If it is, the chain Ch is lined to the front of the chain starting with C3 (850), thereby consolidating the two chains. DoneWork is set to true (830) and OLAP Positioning module 255 proceeds to the next chain in ChainList (805).

If M2 is determined not to be a calculation, C3, in List2 (845), M1 is set to M2 (860) and OLAP Positioning module 255 proceeds to check if M1 is actually a calculation (835) and continues as illustrated.

Figure 9:
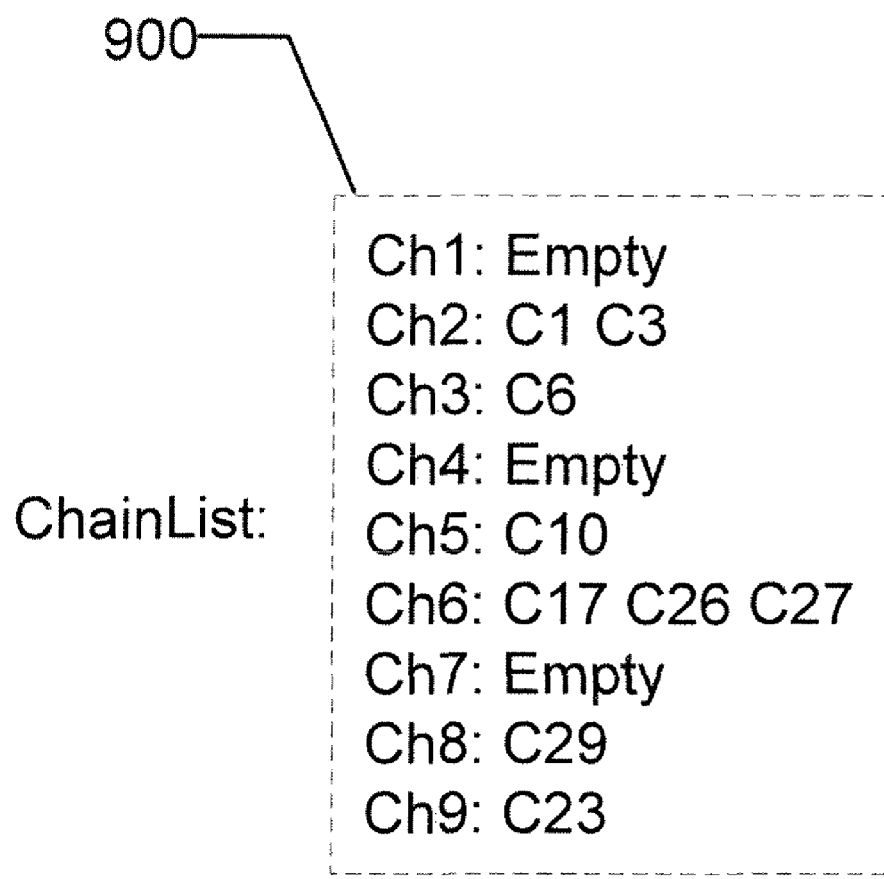
FIG. 9 illustrates the resulting calculation chains after executing the operations of FIG. 8 for the exemplary set of FIG. 4C in accordance with an embodiment of the invention.

FIG. 9 illustrates the resulting calculation chains after executing the operations of FIG. 8 for the exemplary set of FIG. 4C in accordance with an embodiment of the invention. The list of calculation chains, ChainList 900, is shown to contain nine chains, with two chains, Ch2, and Ch6, containing consolidated chains. Ch2, for example, is a result of consolidating Ch1 and Ch2 as illustrated before with reference to FIG. 7. Ch6 is the result of consolidating Ch4, Ch6 and Ch7.

The next step in creating the calculation chains anchors the chains with non-calculated members from the OLAP hierarchy (510). A special case is accounted for when the last calculation in the chain is among the last, i.e., rightmost, calculations within a sibling group. Last sibling calculations are recorded in a list, LastSiblingCalcs, that pairs chains of last sibling calculations with the rightmost descendant of its parent. For example, Ch3 in ChainList 900 includes the calculation C6, which is shown in the desired OLAP hierarchy 400 shown in FIG. 4A to be the last sibling of the sibling group including M1.

In finding the rightmost descendant of a calculation's parent, two cases are considered. The first case corresponds to calculations that have a parent in the hierarchy, for example, last sibling calculations C12, C24, C18, and C30 within sibling groups for non-calculated members M2, M4, M3, and M5 in desired OLAP hierarchy 400. In this case, the rightmost descendant is determined by finding the calculation's parent, getting all non-calculated members that descend from the parent, sorting the descendants in hierarchical order, and taking the last non-calculated member of the hierarchical order to be the rightmost descendant of the calculation's parent.

The second case corresponds to calculations that do not have a parent in the hierarchy, e.g., those calculations that appear in the sibling group of the topmost non-calculated members of the hierarchy (or the root level of the hierarchy). For example, calculation C6 that appears within the sibling group for non-calculated member M1 in OLAP hierarchy 400. In this case, the rightmost descendant is determined by finding all the non-calculated members that inhabit the top level of the hierarchy, sorting them by hierarchical order, taking the last non-calculated member, getting all non-calculated members descending from this last member, sorting those in hierarchical order, and taking the last member. For example, the rightmost descendant for calculation C6 in desired OLAP hierarchy 400 according to these operations is M4.

Figure 10:
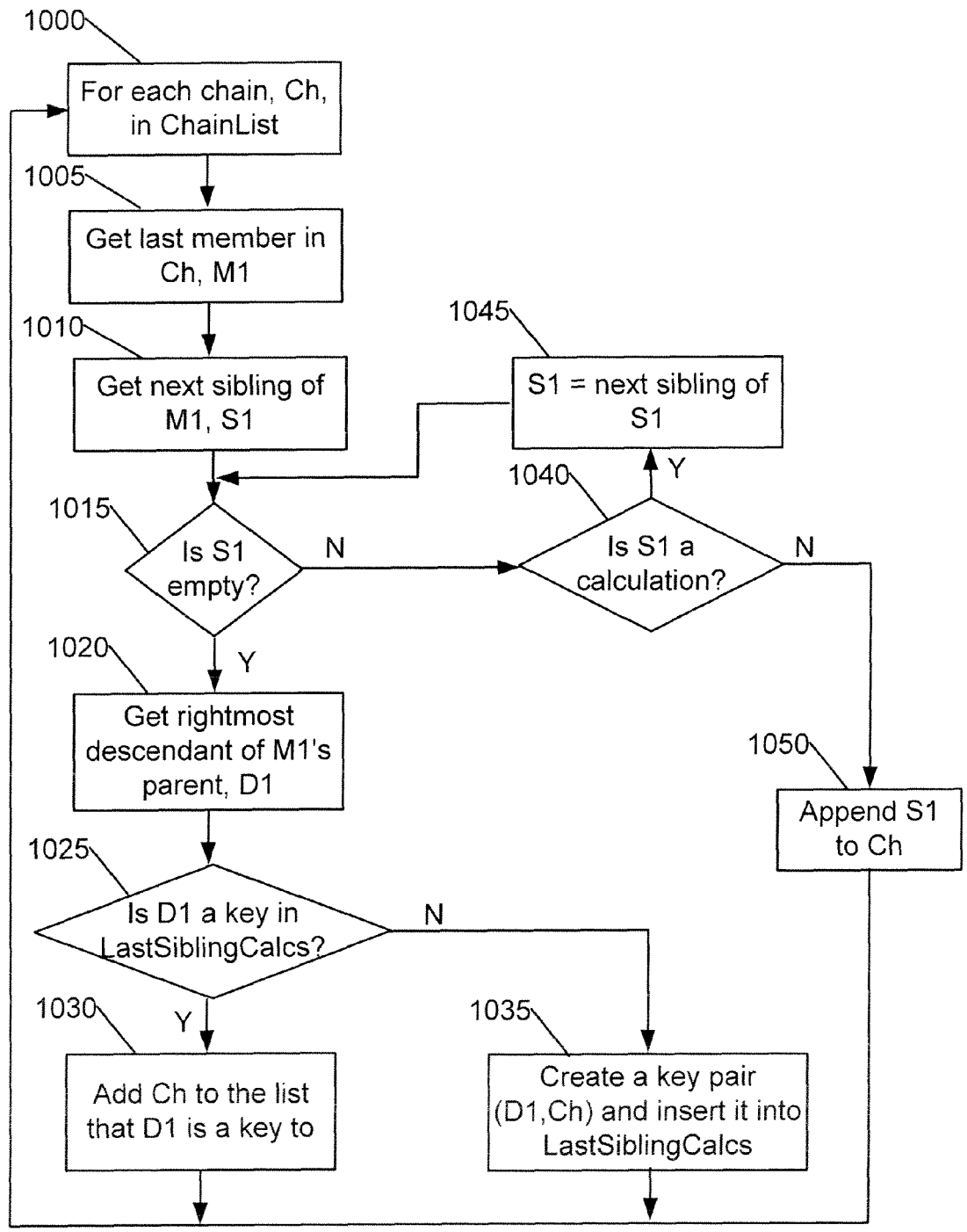
FIG. 10 illustrates a flow chart for anchoring calculation chains with non-calculated members from the OLAP hierarchy in accordance with an embodiment of the invention.

Referring now to FIG. 10, a flow chart for anchoring calculation chains with non-calculated members from the OLAP hierarchy in accordance with an embodiment of the invention is described. For each chain, Ch, in ChainList (1000), the last member in the chain Ch, M1, is obtained. Then the next immediate sibling of M1, S1, is determined (1010). S1 is then checked to determine whether it is empty, that is, whether M1 is the last calculation within is sibling group (1015).

If so, then the rightmost descendant of M1's parent D1 is determined as described above (1020). D1 is then checked to determine whether it is a member of the LastSiblingCalcs list (1025). If it is not, e.g., LastSiblingCalcs is empty, then a key pair containing D1 and M1's chain, Ch, is inserted into the LastSiblingCalcs list (1035). Otherwise, if D1 already exists as a key in the LastSiblingCalcs list, then M1's chain, Ch, is added to the list having D1 as its key (1030).

In case S1 was not empty (1015), that is, in case M11 is not the last calculation within its sibling group, S1 is checked to determine whether it is a calculation (1040). If it is, then S1 is reset to its next sibling (1045) and OLAP Positioning module 255 checks again whether S1 is empty (1015) and proceeds as before. If not, S1 is appended to the chain Ch in ChainList (1050). OLAP Positioning module 255 then proceeds to evaluate the next chain in ChainList (1000).

Figure 11:
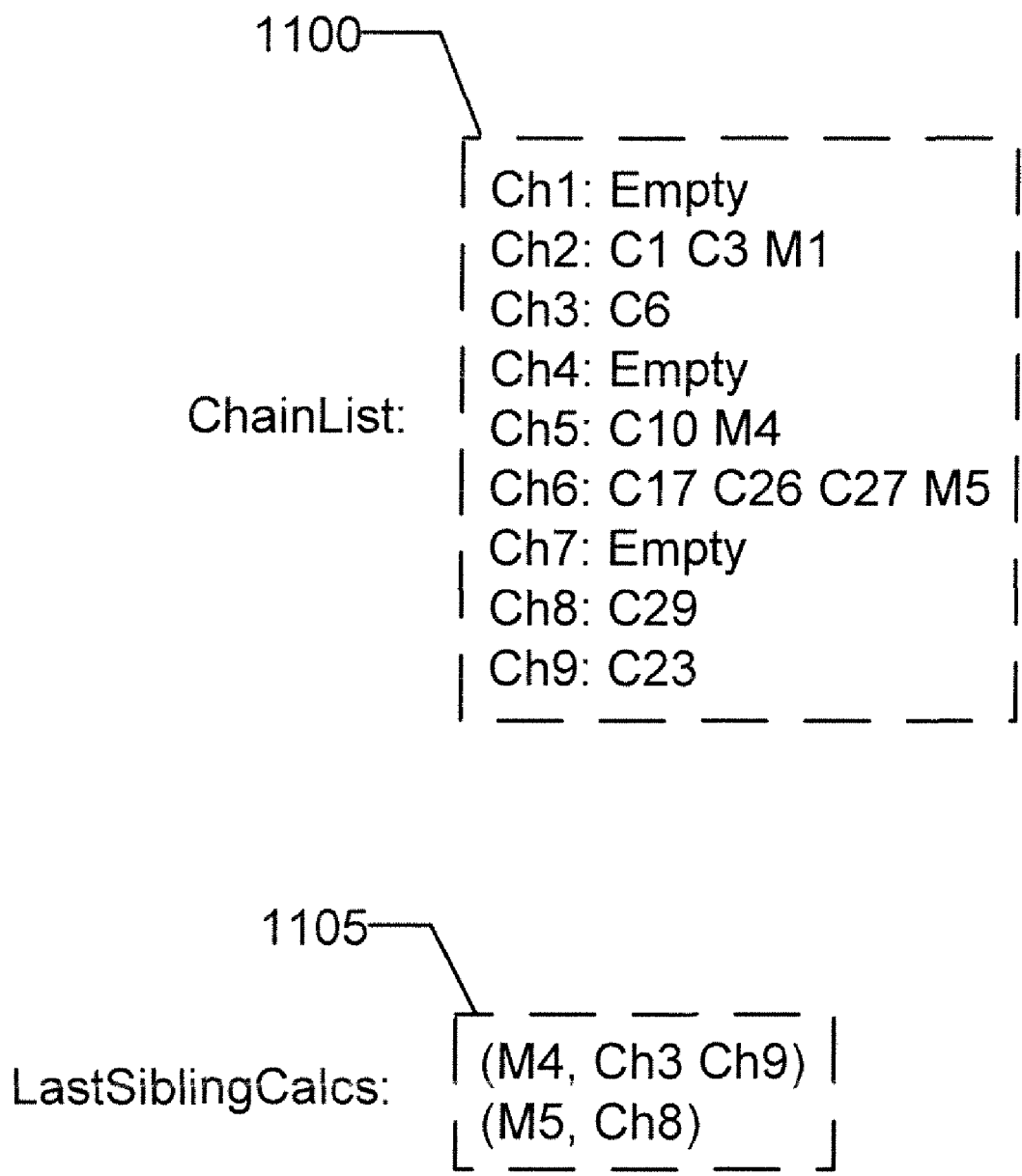
FIG. 11 illustrates the resulting calculation chains after executing the operations of FIG. 10 for the exemplary set of FIG. 4C in accordance with an embodiment of the invention.

FIG. 11 illustrates the resulting calculation chains after executing the operations of FIG. 10 for the exemplary set of FIG. 4C in accordance with an embodiment of the invention.

The list of calculation chains, ChainList 1100, is shown to contain nine chains, with three chains, Ch2, Ch5, and Ch6, anchored by non-calculated members M1, M4, and M5, respectively. Furthermore a LastSiblinCalcs list 1105 is formed containing two lists, both anchored by non-calculated members that serve as the list keys, followed by chains that contain calculations that are among the last siblings within a sibling group. For example, LastSiblingCalcs 1105 contains two lists, one formed by (M4, Ch3 Ch9) and the other formed by (M5, Ch8). C6, C23, and C29 are among the last calculations in their respective sibling groups, as illustrated in desired OLAP hierarchy 400 shown in FIG. 4A.

The next (and last) step in forming the calculation chains is to process those calculation chains having last sibling calculations (515), that is, to account for the lists in the LastSiblingCalcs list, e.g., LastSiblingCalcs list 1105. This step processes the lists in the LastSiblingCalcs list to form corresponding chains in ChainList.

Figure 12:
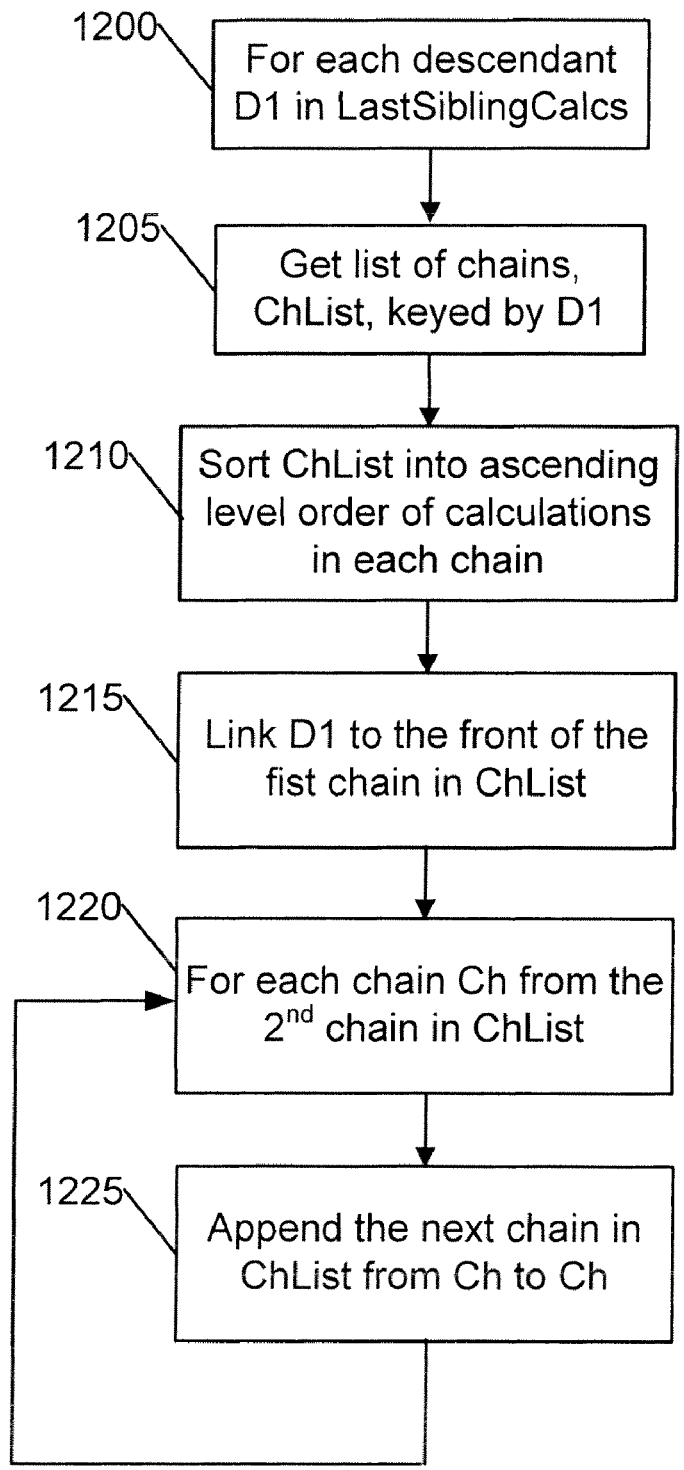
FIG. 12 illustrates a flow chart for processing calculation chains having last sibling calculations in accordance with an embodiment of the present invention.

Referring now to FIG. 12, a flow chart for processing calculation chains having last sibling calculations in accordance with an embodiment of the present invention is described. For each descendant D1 that is a key to a list in the LastSiblingCalcs list (1200), the list of chains, ChList, is obtained (1205). This list of chains ChList is sorted into ascending level order of calculations in each chain (1210). D1 is then linked to the front of the first chain in ChList (1215), and for each chain Ch from the second chain on in ChList (1220), the next chain in ChList is appended from chain to chain (1225).

Figure 13:
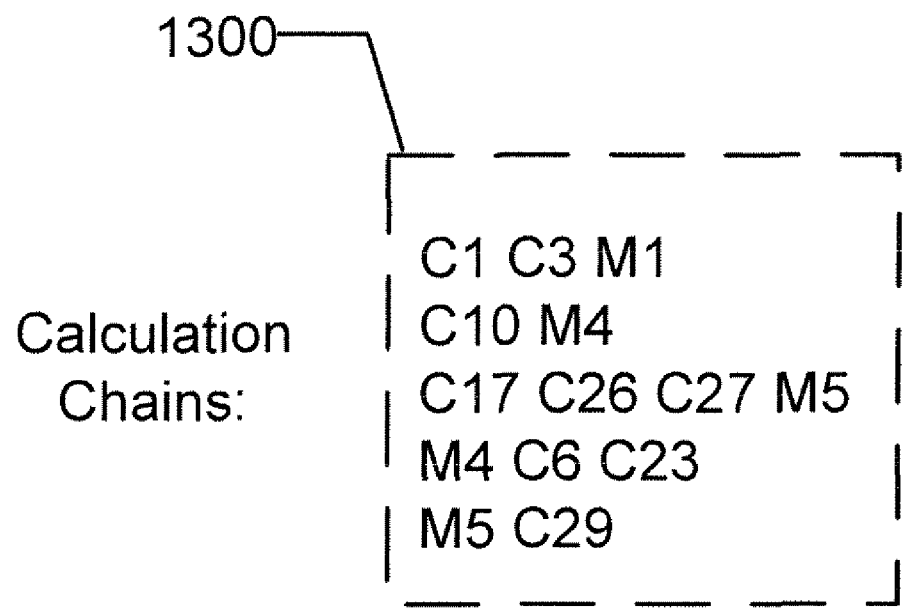
FIG. 13 illustrates the resulting calculation chains after executing the operations of FIG. 12 for the exemplary set of FIG. 4C in accordance with an embodiment of the invention.

FIG. 13 illustrates the resulting calculation chains after executing the operations of FIG. 12 for the exemplary set of FIG. 4C in accordance with an embodiment of the invention. The final list of calculation chains 1300 corresponding to set 410 in FIG. 4C and according to desired OLAP hierarchy 400 in FIG. 4A contains a total of five chains, all anchored by a non-calculated member.

It is appreciated that the operations illustrated with reference to FIGS. 5-13 are shown for purposes of illustration only. Additional and/or alternative operations not shown in FIGS. 5-13 may be used to create calculation chains according to a given OLAP hierarchy desired by a user. For example, additional chains may be consolidated together to reduce the total number of chains. OLAP Positioning module 255 could also be modified so that instead of finding a member's next sibling throughout the calculation of chains, it would simply find the next member in a hierarchy.

After the chains are created, the user-created set, e.g., set 410 in FIG. 413, can be evaluated in the desired order, i.e., in the order specified by the user. To do so, data manipulation statements are generated to split the set at appropriate points for inserting the formed calculation chains in the desired position.

Figure 14:
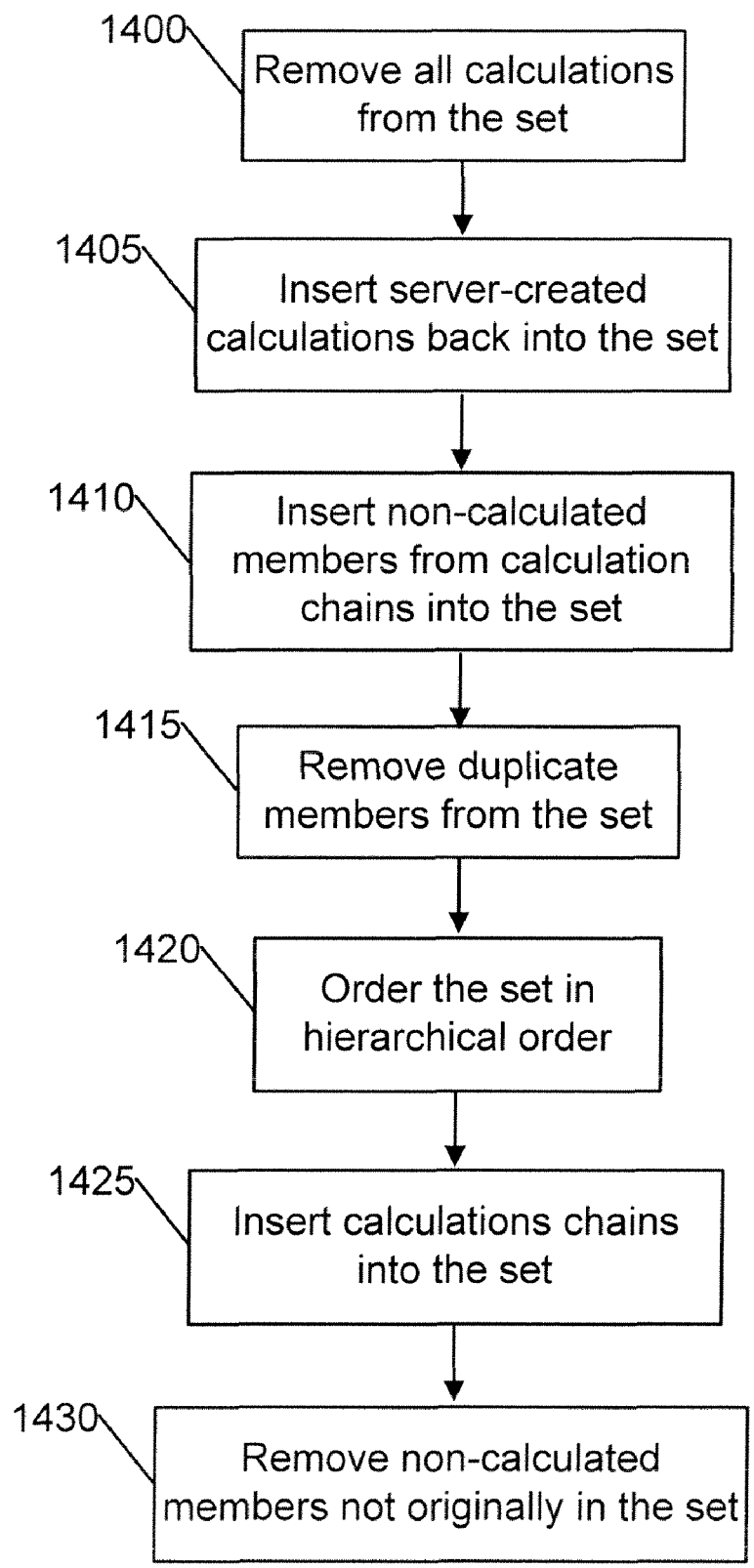
FIG. 14 illustrates a flow chart for generating data manipulation statements to evaluate the set based on the user-specified positions for the user-created calculations in accordance with an embodiment of the invention.

Referring now to FIG. 14, a flow chart for generating data manipulation statements to evaluate the set based on the user-specified positions for the user-created calculations in accordance with an embodiment of the invention is described. First, all calculations are removed from the set to be evaluated (1400). Next, any server-based calculations existing in the desired OLAP hierarchy are added back into the set (1405). The non calculated members from the calculations chains (1300) are added to the set (1410). The duplicate members are removed from the set (1415). The set is then ordered in hierarchical order (1420) and split accordingly to insert the calculation chains into the set (1425). Lastly, any non-calculated members that were not originally in the set are removed (1430).

Figure 15:
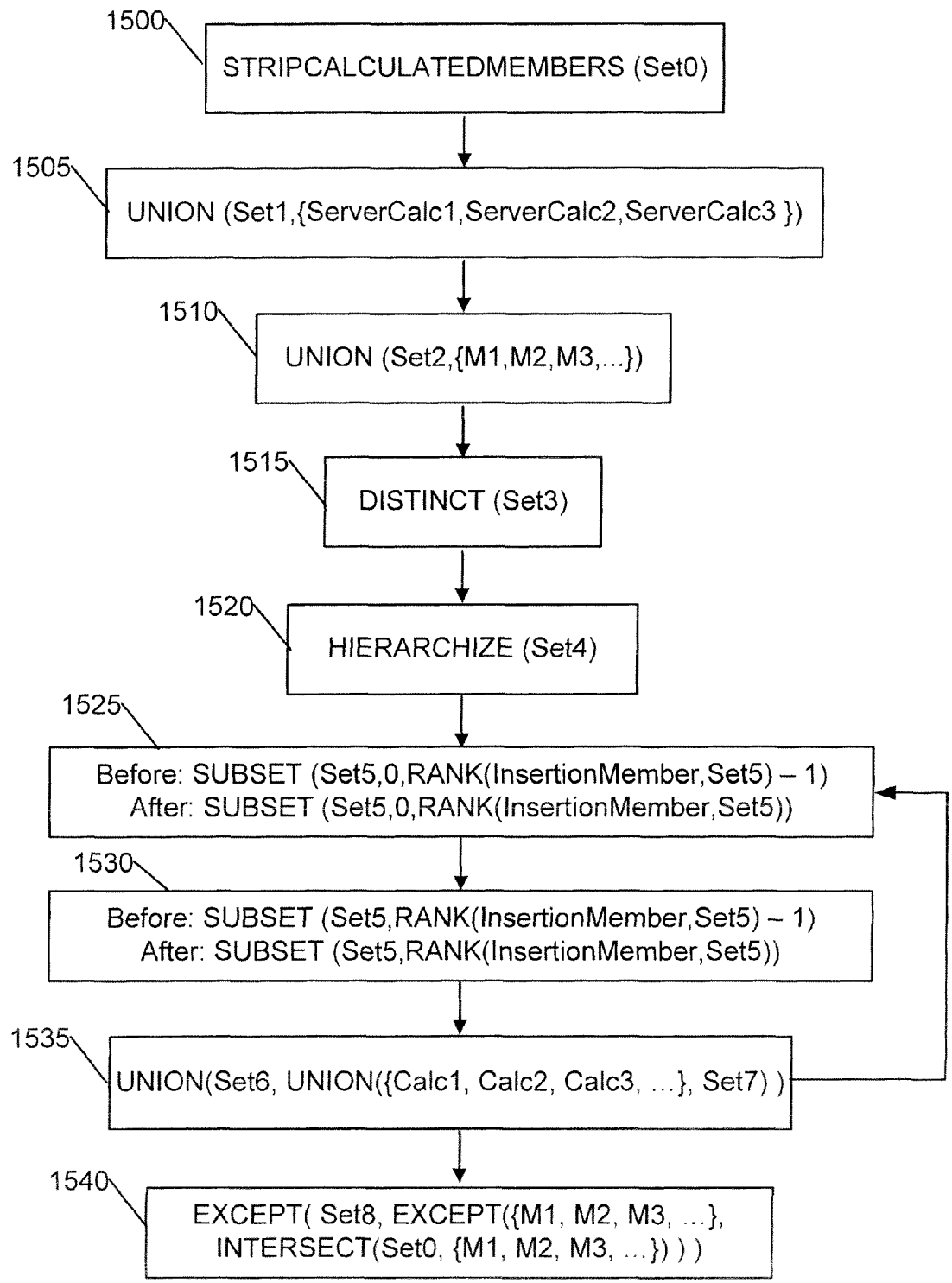
FIG. 15 illustrates the data manipulation statements generated by executing the operations of FIG. 14 in accordance with an embodiment of the invention.

FIG. 15 illustrates the data manipulation statements generated by executing the operations of FIG. 14 in accordance with an embodiment of the invention. The set to be evaluated is referred to as Set0. Each step shown in FIG. 14 has at least one corresponding MDX statement. Initially, removing all calculated members from the set (1400) is implemented with the MDX statement "STRIPCALCULATEDMEMBERS (Set0)" to result in a set referred to as Set1 (1500). Next, adding server-based calculations (1405) back into the set is implemented with the MDX statement "UNION(Set1,{ServerCalc1,ServerCal2,ServerCalc3, . . . })" (1505) to result in a set referred to as Set2.

Adding any members that form the calculation chains is implemented with the MDX statement "UNION(Set2, {M1, M2, M3, . . . })" (1510) to result in a set referred to as Set3. The set is made distinct by removing duplicate members with the MDX statement "DISTINCT(Set3)", resulting in a set referred to as Set4 (1515). The set is ordered in hierarchical order with the MDX statement "HIERARCHIZE(Set4)", resulting in an ordered set referred to as Set5 (1520).

Next, for each calculation chain to be inserted into the set, the set is split accordingly so the calculations are inserted in the desired order as specified by the user (1425). This is accomplished in three operations: first, a subset is formed from Set5 from the first member in Set5 up to (or including) the non-calculated member anchoring the chain, referred to herein below as the "insertion member". This step is implemented with a "SUBSET" MDX statement with parameters depending on whether the insertion member is positioned, either splitting the set before or after the insertion member (1525). This set is referred to as Set6.

In the second step, a similar split is performed, again by using a "SUBSET" MDX statement with parameters depending on the insertion member's position within the set (1530). This set takes all the members from the insertion member (or just after the insertion member) until the end of the set. This set is referred to as Set7. Whether the subset includes or excludes the insertion member depends on whether the calculations from the calculation chain are to be inserted before or after the insertion member. Lastly, the two subsets are joined together with the calculations from the current calculation chain by using the "UNION" MDX statement (1535). This set is referred to as Set8. The non-calculated members not originally present in Set0 are then removed (1430) with the "EXCEPT" and "INTERSECT" MDX statements (1540).

It is appreciated that executing the MDX statements illustrated in FIG. 15 results in the user-created set to be evaluated as desired by the user, i.e., to be evaluated according to the user-specified positions. It is also appreciated that the correct evaluation is returned as a result of the calculation chains that are formed according to the user-specified positions.

For example, consider the desired hierarchy 400 illustrated in FIG. 4A. Now consider that the initial hierarchy only contains the members M1, M2, and M3, and that the user desires to add a user-created calculation, C1, to the left of member M1 in the existing hierarchy. Adding C1 to a hierarchically sorted set containing M1, M2, and M3, would traditionally result in the set being evaluated to "M1 M2 M3 C1" as C1 is created as the last sibling of M1. However, since the user specifically positioned C1 to the left of M1 when adding C1 to the set, OLAP Positioning module 255 creates calculation chains and partitions the set as described above to execute MDX statements as shown in FIG. 15 so that the set evaluation returns "C1 M1 M2 M3", according to the desired user-specified positions.

Figure 16:
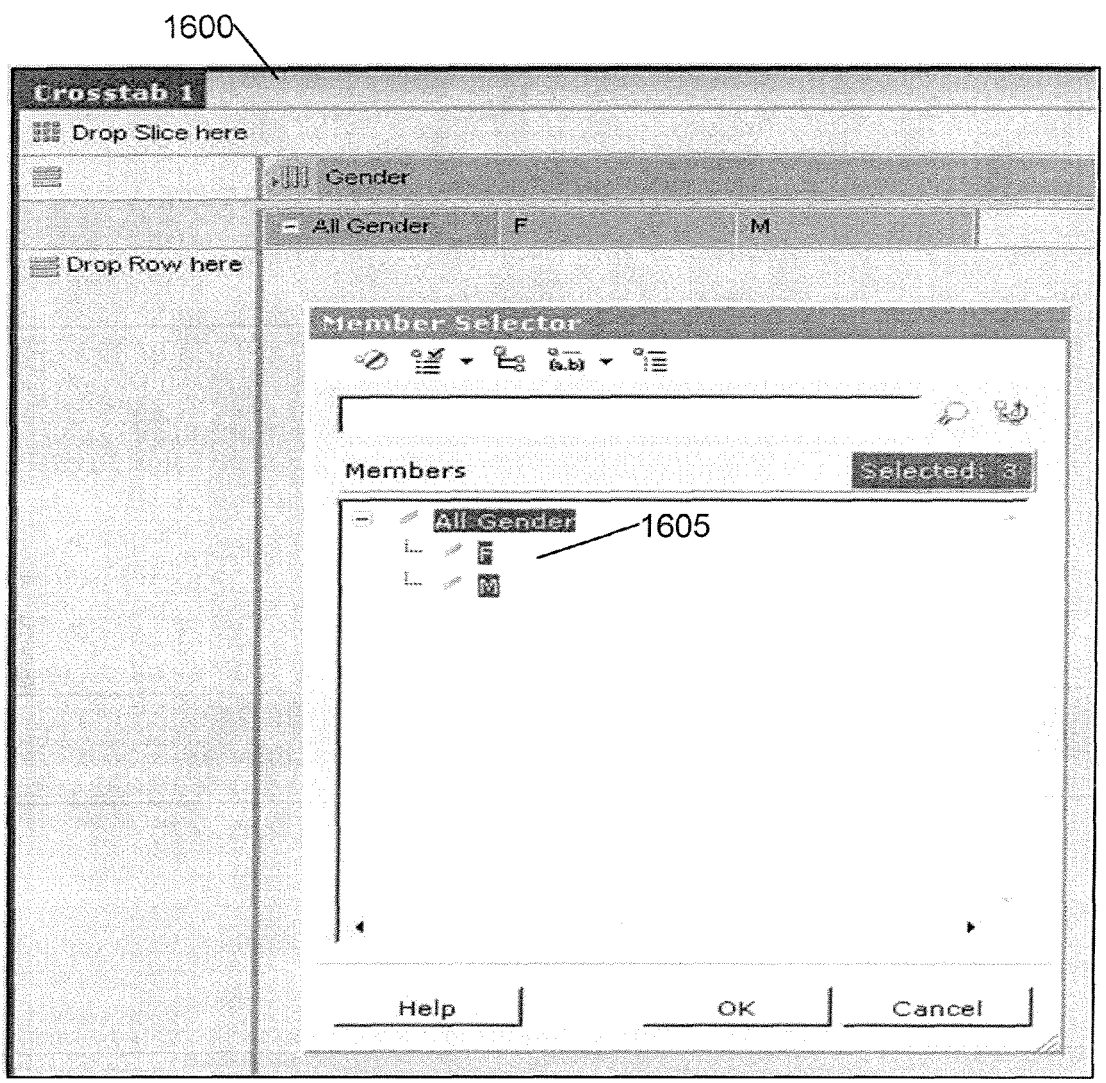
FIG. 16 illustrates an exemplary GUI for creating and evaluating a set in accordance with an embodiment of the invention.

According to an embodiment of the invention, the user may create and evaluate sets within a GUI created with OLAP GUI module 245. Referring now to FIG. 16, an exemplary GUI for creating and evaluating a set in accordance with an embodiment of the invention is described. GUI window 1600 may be used by a user to create a set for a given hierarchy. For example, GUI window 1600 may be used by a user to select a set of an existing hierarchy, such as set 1605. The user may then choose to create and add calculations to the set as desired.

Figure 17:
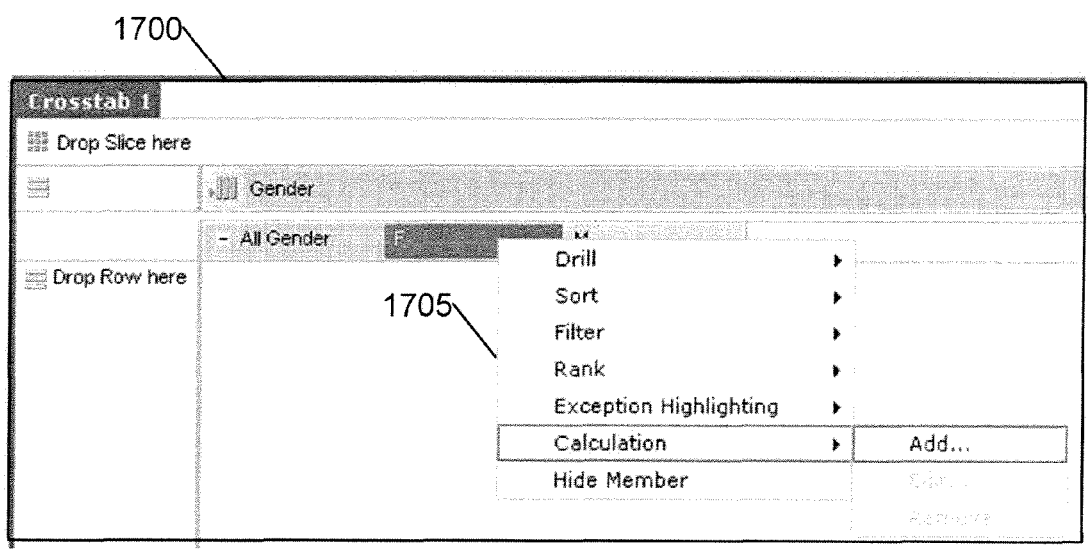
FIG. 17 illustrates an exemplary GUI window for adding a user-created calculation to a set in accordance with an embodiment of the invention.

FIG. 17 illustrates an exemplary GUI window for adding a user-created calculation to a set in accordance with an embodiment of the invention. The user may specify in GUI window 1700 that a calculation 1605 is to be added to set. The user may add the calculation to the left or to the right of any member in the set by clicking on the set member to invoke a pull-down menu, such as pull-down menu 1705, such as, for example, by clicking on the "F" member in the "Gender" hierarchy as illustrated in window 1700.

Figure 18:
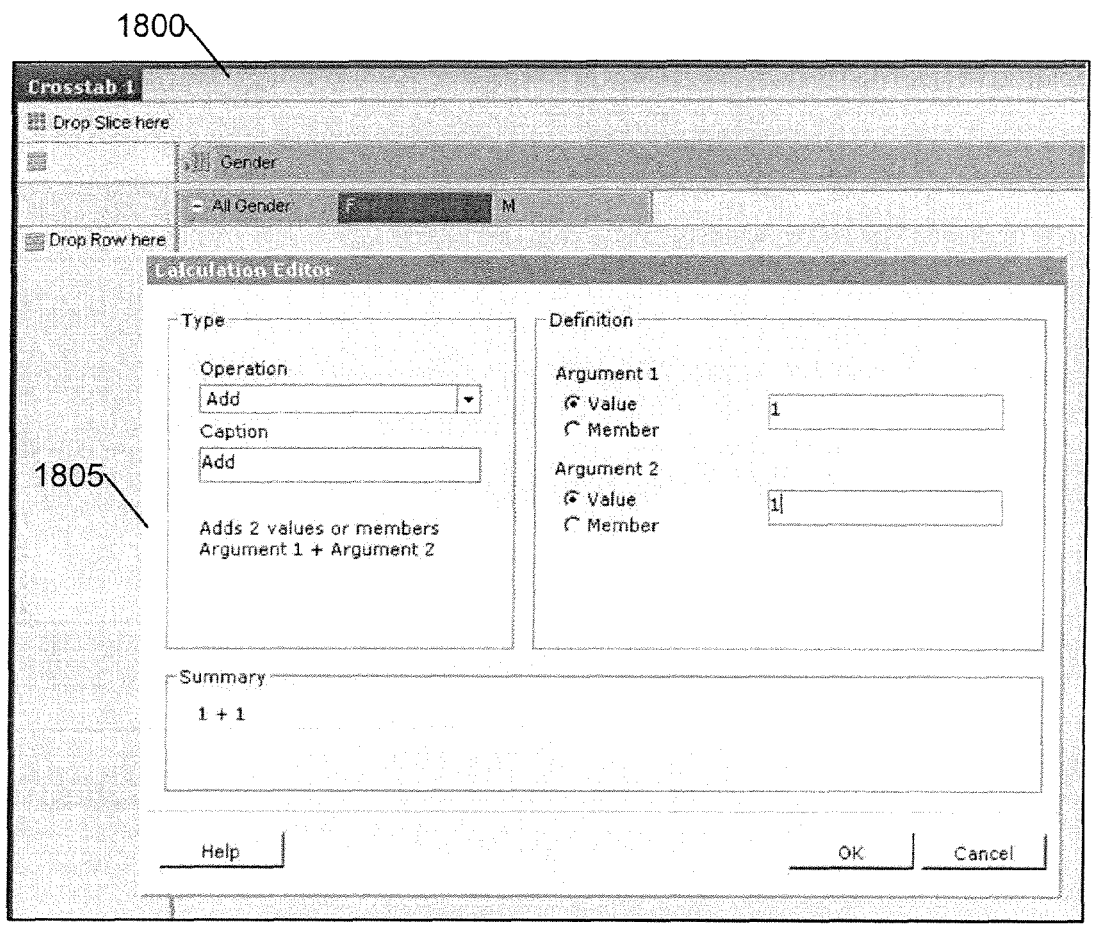
FIG. 18 illustrates an exemplary GUI window for specifying the calculation to be added to a set in accordance with an embodiment of the invention.
Figure 19:
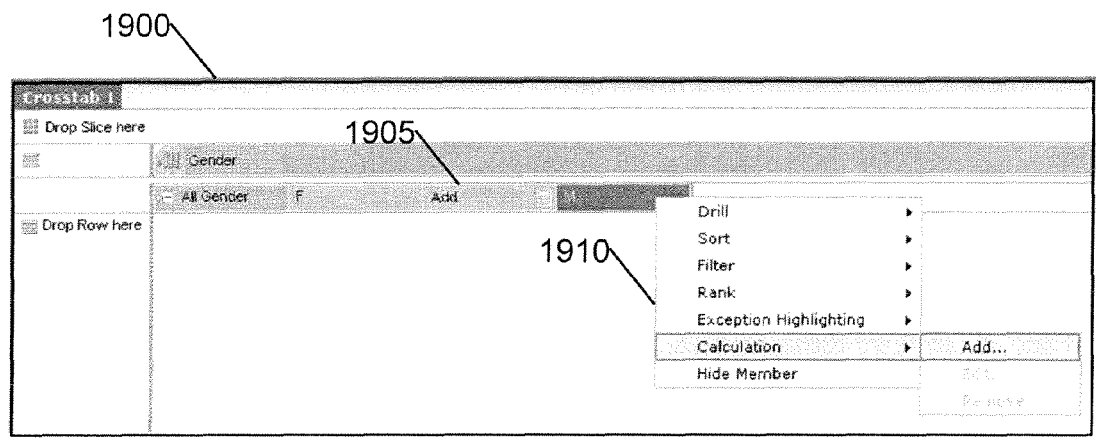
FIG. 19 illustrates another exemplary GUI window for adding a user-created calculation to a set in accordance with an embodiment of the invention.

FIG. 18 illustrates an exemplary GUI window for specifying a calculation to be added to a set in accordance with an embodiment of the invention. The calculation to be added by the user may be specified in GUI window 1800 by using a calculation editor, such as Calculation Editor 1805. The user may specify a name or caption for the new calculation, the operation that is to be performed by the calculation, as well as any arguments that the calculation may have. The added calculation is illustrated in FIG. 19 as calculation 1905 appearing to the right of member "F" in GUI window 1900.

Figure 20:
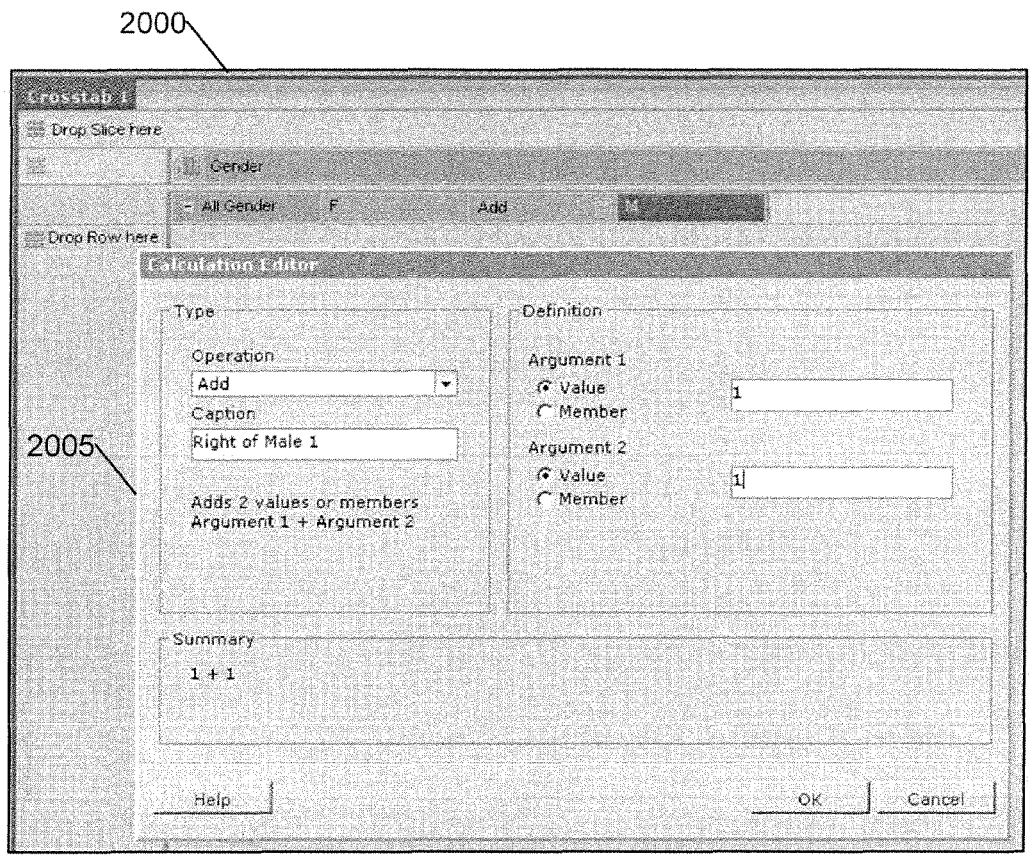
FIG. 20 illustrates another exemplary GUI window for specifying the calculation to be added to a set in accordance with an embodiment of the invention.
Figure 21:
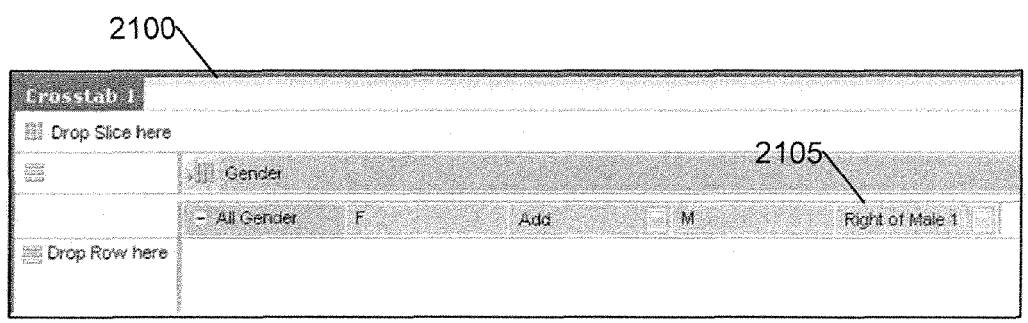
FIG. 21 illustrates an exemplary GUI window showing user-created calculations added to a set in accordance with an embodiment of the invention.

Additional calculations may be added at any time by repeating the same process illustrated in FIGS. 16-18. For example, the user may decide to add another calculation to the right of member "M" in the "Gender" hierarchy. To do so, the user clicks on the desired member to invoke pull-down menu 1910. A calculation editor is then displayed on another GUI window, i.e., Calculation Editor 2005 in GUI window 2000 shown in FIG. 20, where the user can specify the calculation attributes, e.g., its caption, operation, and arguments. The added calculation is shown in GUI window 2100 in FIG. 21 as calculation 2105.

Figure 22:
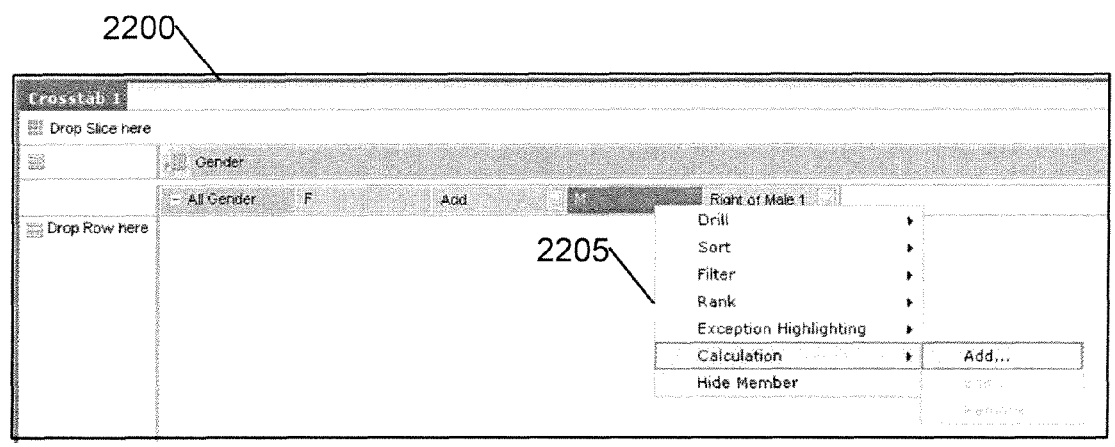
FIG. 22 illustrates an exemplary GUI window for adding a user-created calculation to a set in accordance with an embodiment of the invention.
Figure 23:
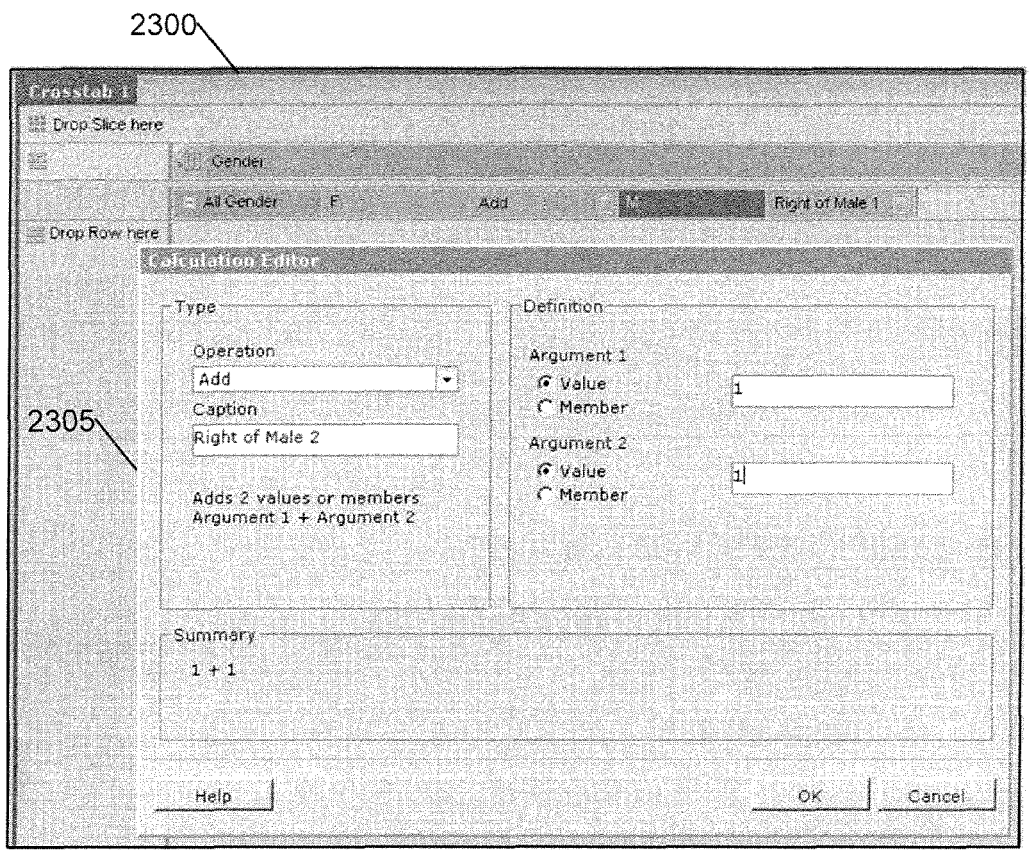
FIG. 23 illustrates an exemplary GUI window for specifying the calculation to be added to a set in accordance with an embodiment of the invention.
Figure 24:
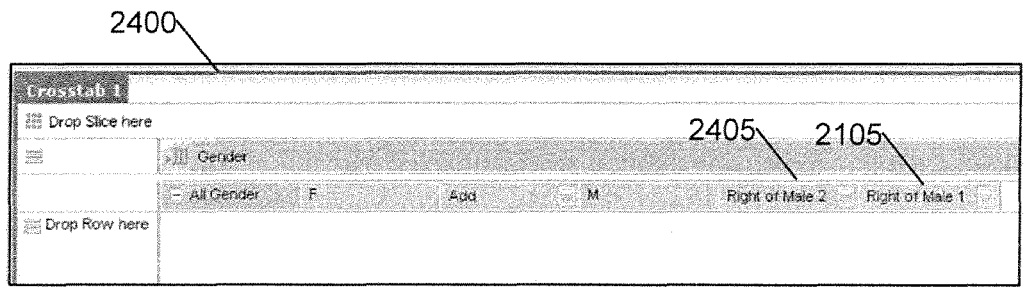
FIG. 24 illustrates an exemplary GUI window showing user-created calculations added to a set in accordance with an embodiment of the invention.

It is appreciated that the user may also add a calculation to the left or to the right of another user-created calculation. For example, referring now to FIGS. 22-24, the user may click on the "M" member in GUI window 2200 to invoke pull-down menu 2205 to add another calculation to the right of "M". Calculation Editor 2305 in GUI window 2300 is then displayed for the user to specify the calculation attributes. The newly created calculation 2405 is shown to be to the right of member "M" but to the left of calculation 2105 previously added by the user.

Figure 25:
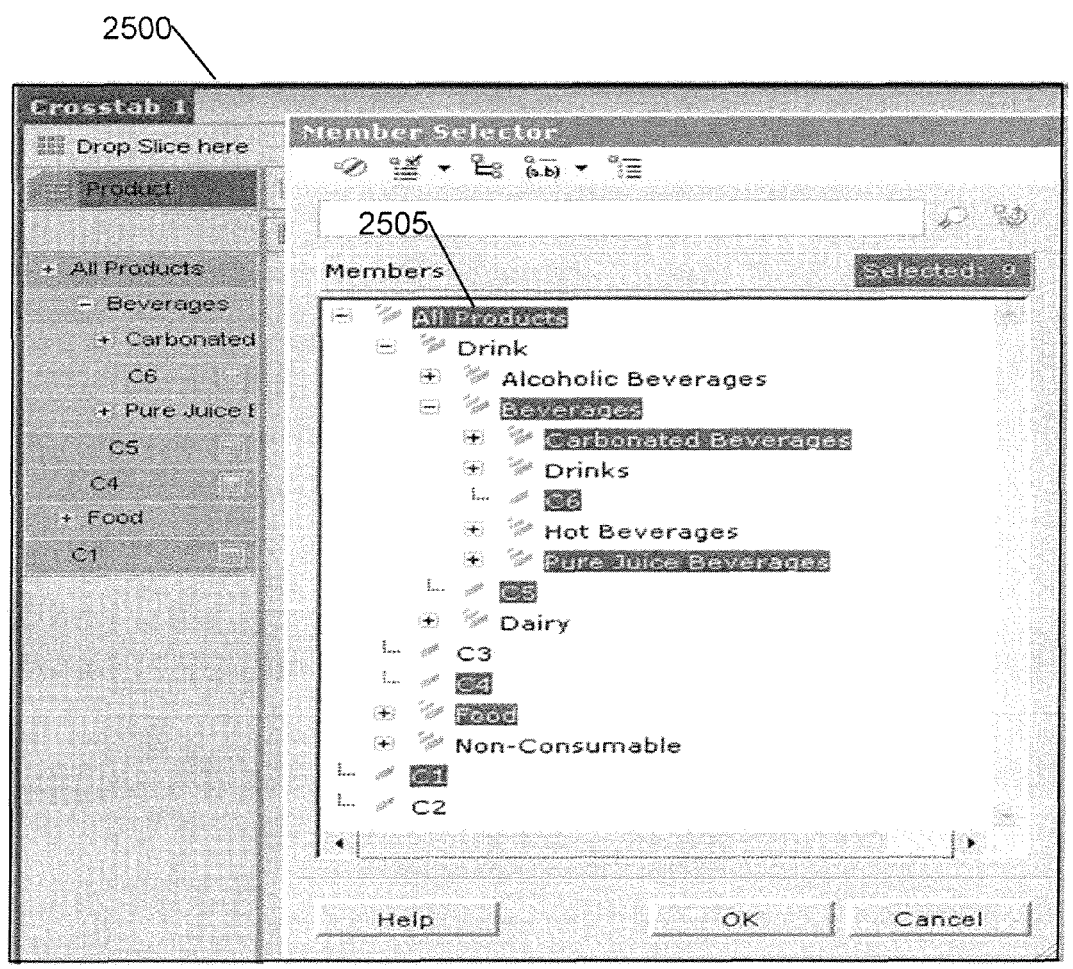
FIG. 25 illustrates a multi-level OLAP hierarchy with user-created calculations in accordance with an embodiment of the invention.

FIG. 25 illustrates a multi-level OLAP hierarchy with user-created calculations in accordance with an embodiment of the invention. OLAP hierarchy 2505 in GUI window 2500 is shown with several user-created calculations C1-C6 that are included in different positions, to the left or to the right of other hierarchy members.

Advantageously, the present invention enables users to create and evaluate sets of an OLAP hierarchy according to user-specified positions. The sets are evaluated with traditional MDX statements that are implemented to properly insert calculation chains that are generated based on those positions.

The foregoing description, for purposes of explanation used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A non-transitory computer readable storage medium, comprising executable instructions to:
   receive user-created data with user-specified positions in a pre-existing OLAP hierarchy, wherein the OLAP hierarchy comprises members arranged in position specified by an OLAP server, wherein the user-created data with user-specified positions in the OLAP hierarchy is expressed as a multidimensional expression listing the user-created data relative to user-created data siblings to the left and right of the user created data, the user-specified positions differing from positions that would have been specified by the OLAP server absent the user-created data, wherein the user-created data is received via a graphical user interface displayed to a user for defining user-created data at the user-specified positions in the OLAP hierarchy and adding the user-created data to the OLAP hierarchy at server-specified positions;
   generate data manipulation statements to insert the user-created data in user-specified positions of the OLAP hierarchy, wherein the user-specified positions specify lineage of the user-created data and order of the user-created data relative to the user-created data siblings; and
   rearrange the OLAP hierarchy to reposition the user-created data from the server-specified positions into the user-specified positions.

2. The computer readable storage medium of claim 1, wherein the user-created data comprises one or more calculations.

3. The computer readable storage medium of claim 1, wherein the executable instructions to generate data manipulation statements comprise executable instructions to create a calculation chain as an ordered list of calculations with one non-calculated member of the OLAP hierarchy.

4. The computer readable storage medium of claim 3, further comprising executable instructions to consolidate calculation chains having common siblings.

5. The computer readable storage medium of claim 4, further comprising executable instructions to anchor each calculation chain with a non-calculated member from the OLAP hierarchy.

6. The computer readable storage medium of claim 5, wherein the executable instructions to anchor each calculation chain comprises executable instructions to position the non-calculated member in the first or last position in the calculation chain.

7. The computer readable storage medium of claim 6, further comprising executable instructions to create one or more last sibling lists keyed by a non-calculated member and comprising last sibling calculations from the user-created data set.

8. The computer readable storage medium of claim 7, further comprising executable instructions to create a calculation chain starting with the key non-calculated member in each last sibling list followed by calculation chains keyed by the non-calculated member in ascending order.

9. The computer readable storage medium of claim 8, wherein the executable instructions to generate data manipulation statements comprise executable instructions to generate a query to remove all calculations from the user-created data set.

10. The computer readable storage medium of claim 9, further comprising executable instructions to generate a query to insert server-created calculations back into the user-created data set.

11. The computer readable storage medium of claim 10, further comprising executable instructions to:
    insert non-calculated members from the calculation chains into the user-created data set; and
    remove the non-calculated members from the calculation chains from the user-created data set.

12. The computer readable storage medium of claim 11, further comprising executable instructions to remove duplicate members from the user-created data set.

13. The computer readable storage medium of claim 12, further comprising executable instructions to order the user-created data set in hierarchical order.

14. The computer readable storage medium of claim 13, further comprising executable instructions to insert the calculation chains into the user-created data set.

15. A method for positioning user-created data in a pre-existing OLAP hierarchy, comprising:
    receiving user-created data with user-specified positions in the OLAP hierarchy, wherein the OLAP hierarchy comprises members arranged in positions specified by an OLAP server, wherein receiving the user-created data with user-specified positions in the OLAP hierarchy includes receiving a multidimensional expression listing the user-created data relative to user-created data siblings to the left and right of the user created data, wherein the user-created data is received via a graphical user interface displayed to a user for defining user-created data at the user-specified positions in the OLAP hierarchy and adding the user-created data to the OLAP hierarchy at server-specified positions;
    generating data manipulation statements to insert the user-created data at the user-specified positions in the OLAP hierarchy, wherein the user-specified positions specify lineage of the user-created data and order of the user-created data relative to the user-created data siblings;
    evaluating a set of members of the OLAP hierarchy according to the user-specified positions; and
    reorganizing the OLAP hierarchy to reposition the user-created data from the server-specified positions into the user-specified positions.

16. The method of claim 15, wherein reorganizing the OLAP hierarchy comprises:
    forming a list of calculation chains from the user-created data;
    consolidating calculation chains in the list of calculation chains that have common siblings;
    anchoring each calculation chain in the list of calculation chains with a non-calculated member from the OLAP hierarchy; and
    processing calculation chains from the list of calculation chains having last sibling calculations in the OLAP hierarchy.

17. The method of claim 16, wherein generating data manipulation statements comprises:
    generating a query to remove all calculations from the set;
    inserting server-created calculations back into the set;
    inserting non-calculated members that are siblings of the server-created calculations back into the set;

removing duplicate members from the set;
ordering the set in hierarchical order; and
inserting the calculation chains from the list of calculation chains into the set.

18. A non-transitory computer readable storage medium, comprising executable instructions to:
receive user-created data with user-specified positions in a pre-existing OLAP hierarchy defining a set, wherein the OLAP hierarchy comprises members arranged in position specified by an OLAP server, wherein the user-created data with user-specified positions in the OLAP hierarchy is expressed as a multidimensional expression listing the user-created data relative to user-created data siblings to the left and right of the user created data, wherein a portion of the members are calculated members, the user-specified positions differing from positions that would have been specified by the OLAP server absent the user-created data, wherein the user-created data is received via a graphical user interface displayed to a user for defining user-created data at the user-specified positions in the OLAP hierarchy and adding the user-created data to the OLAP hierarchy at server-specified positions;
generate data manipulation statements to insert the user-created data in user-specified positions of the OLAP hierarchy by recursively splitting the set into two parts, a first part including members that should appear before a corresponding non-calculated member and a second part including members that should appear after a corresponding non-calculated member, wherein calculated members situated at a position in the hierarchy indicated by the split are inserted into the split and user-specified positions specify lineage of the user-created data and order of the user-created data relative to the user-created data siblings; and
rearrange the OLAP hierarchy to reposition the user-created data from the server-specified positions into the user-specified positions.

* * * * *